(12) United States Patent
West

(10) Patent No.: US 11,273,923 B2
(45) Date of Patent: Mar. 15, 2022

(54) FAIL-SAFE ENGINE SUPPORT SYSTEM

(71) Applicant: SPIRIT AEROSYSTEMS, INC., Wichita, KS (US)

(72) Inventor: Randall Ray West, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 453 days.

(21) Appl. No.: 16/509,817

(22) Filed: Jul. 12, 2019

(65) Prior Publication Data

US 2021/0010424 A1 Jan. 14, 2021

(51) Int. Cl.
*B64D 27/26* (2006.01)
*F02C 7/20* (2006.01)
*F01D 25/28* (2006.01)
*B64D 27/18* (2006.01)

(52) U.S. Cl.
CPC ............. *B64D 27/26* (2013.01); *F02C 7/20* (2013.01); *B64D 27/18* (2013.01); *B64D 2027/266* (2013.01); *B64D 2027/268* (2013.01); *F01D 25/28* (2013.01)

(58) Field of Classification Search
CPC ........... B64D 27/26; B64D 27/18; F02C 7/20; F01D 25/28
See application file for complete search history.

(56) References Cited

U.S. PATENT DOCUMENTS

| 2,818,225 | A |  | 3/1954 | Kent |  |
| 3,844,115 | A |  | 10/1974 | Freid |  |
| 5,351,930 | A | * | 10/1994 | Gwinn | F16F 1/40 248/557 |
| 6,059,227 | A | * | 5/2000 | Le Blaye | B64D 27/26 244/54 |
| 6,189,830 | B1 | * | 2/2001 | Schnelz | B64D 27/18 244/54 |
| 6,209,822 | B1 |  | 4/2001 | Le Blaye |  |
| 6,330,995 | B1 | * | 12/2001 | Mangeiga | B64D 27/26 244/54 |
| 6,401,448 | B1 |  | 6/2002 | Manteiga et al. |  |
| 6,474,596 | B1 | * | 11/2002 | Cousin | B64D 27/26 244/131 |

(Continued)

FOREIGN PATENT DOCUMENTS

GB 2010969 12/1978

*Primary Examiner* — Michael H Wang
(74) *Attorney, Agent, or Firm* — Hovey Williams LLP

(57) ABSTRACT

An engine support mount including an airframe structure having a first anchor surface and a length extending along an x-axis, with a second axis defined perpendicularly to the x-axis. A support member is fixed to the airframe structure and defines a first aperture and a second aperture. A mounting assembly includes an elongated arm and first and second primary attachment assemblies respectively attaching the arm to the support member at the first and second apertures, the arm having a second anchor surface. A moment arm reduction feature includes a lug fixed to one of the anchor surfaces and a corresponding fastener fixed to the other of the anchor surfaces. The first anchor surface is positioned on the airframe structure outside of the first and second apertures, and the second anchor surface is positioned on the arm outside of the first and second attachment assemblies.

20 Claims, 19 Drawing Sheets

(56) References Cited

U.S. PATENT DOCUMENTS

| | | | | |
|---|---|---|---|---|
| 6,607,165 B1* | 8/2003 | Manteiga | ............... | B64D 27/18 |
| | | | | 244/54 |
| 6,843,449 B1* | 1/2005 | Manteiga | ............... | B64D 27/26 |
| | | | | 244/54 |
| 7,267,301 B2* | 9/2007 | Dron | ..................... | B64D 27/20 |
| | | | | 244/54 |
| 8,348,191 B2 | 1/2013 | West | | |
| 8,827,203 B2 | 9/2014 | Balk | | |
| 11,149,650 B2* | 10/2021 | Adams | ................... | F02C 3/107 |
| 2005/0269446 A1* | 12/2005 | Dron | ..................... | B64D 27/26 |
| | | | | 244/54 |
| 2007/0246603 A1* | 10/2007 | Udall | .................... | B64D 27/20 |
| | | | | 244/54 |
| 2012/0012732 A1* | 1/2012 | Zameroski | ............ | B64C 27/001 |
| | | | | 248/638 |

\* cited by examiner

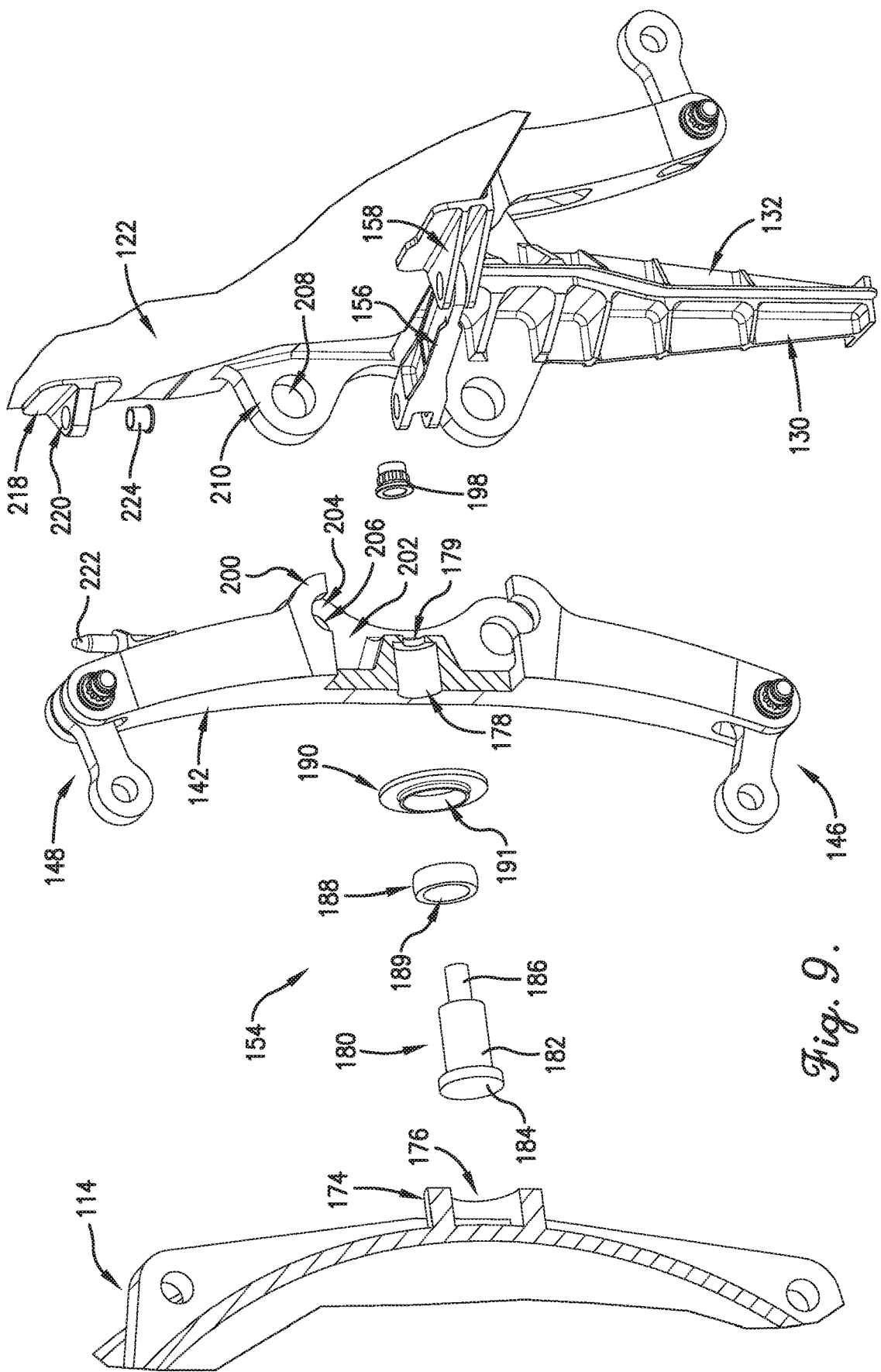

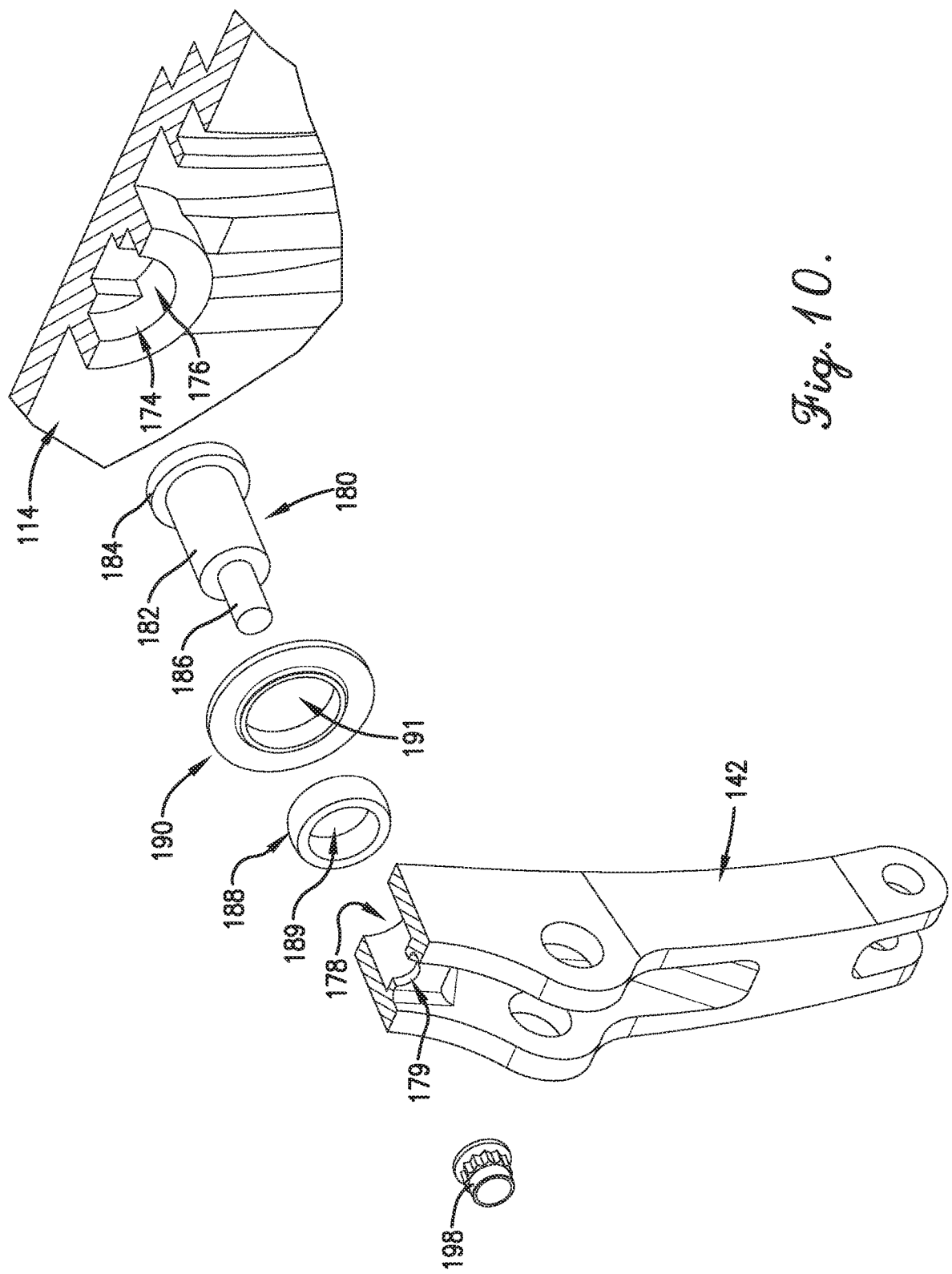

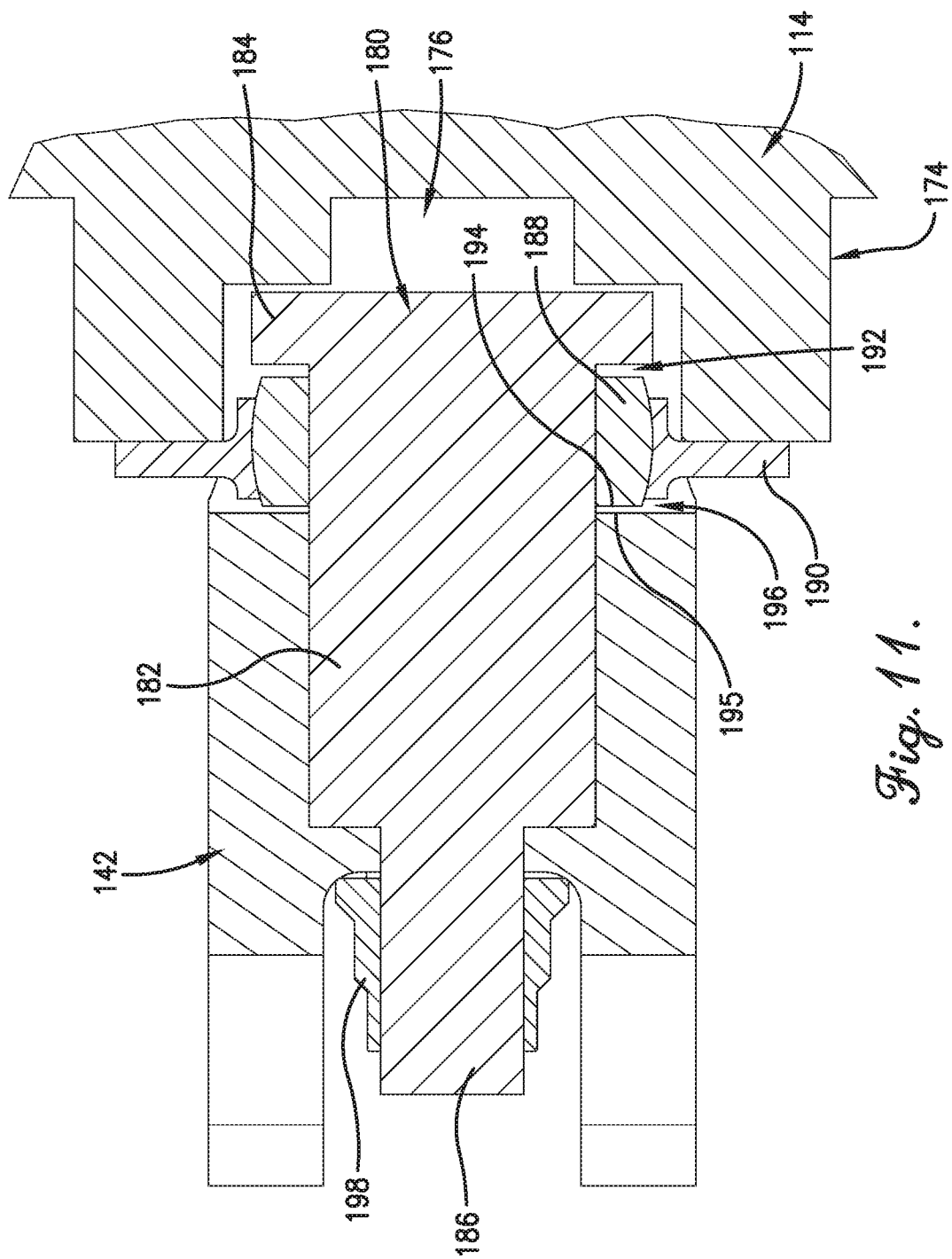

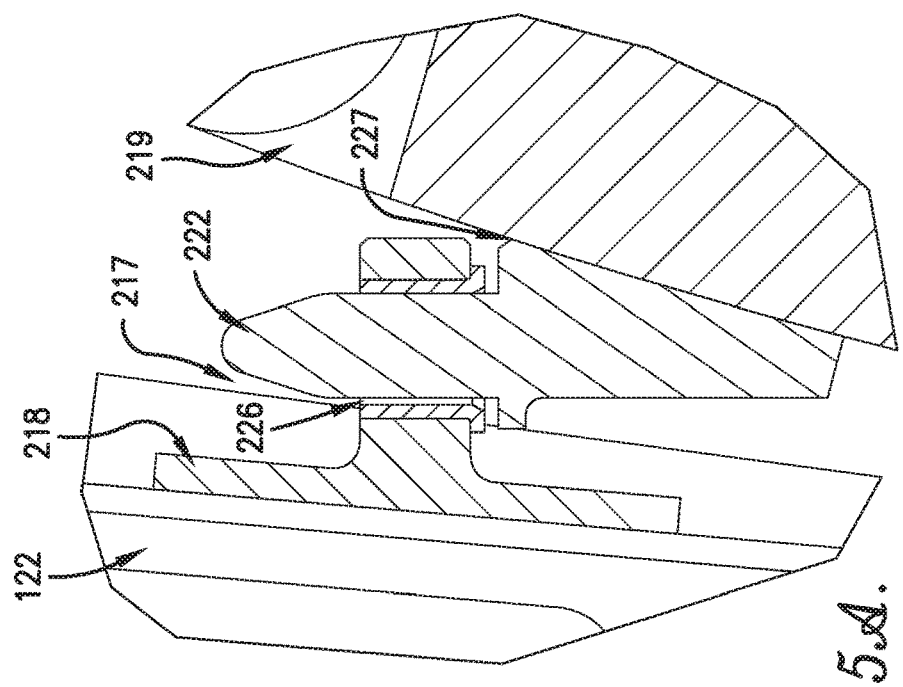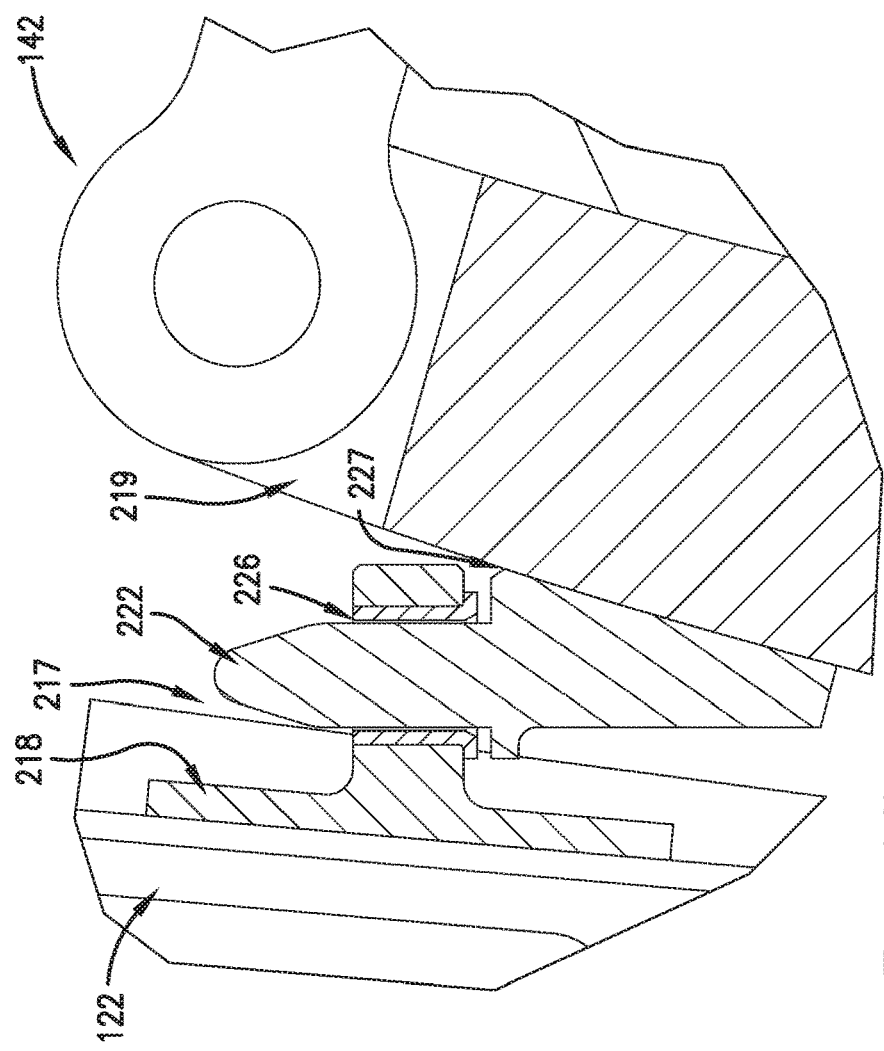

FAIL-SAFE ENGINE SUPPORT SYSTEM

BACKGROUND OF THE INVENTION

Field of the Invention

The present invention relates to aircraft engine mounts. More particularly, the invention relates to turbofan engine mounts that provide fail-safety.

Description of the Related Art

Aircraft engines are commonly mounted to an aircraft's wings, fuselage, or tail by an aircraft engine mounting apparatus that connects to a mounting structure, such as a pylon. The engine mounting apparatus must be able to withstand vertical loads, such as gravity, horizontal loads, such as the thrust of the aircraft engine, lateral loads, such as wind buffeting, and axial loads, such as the rotational force of the aircraft engine. It is imperative that failure of a part of the aircraft engine mounting apparatus due to the extreme forces exerted thereon does not cause loss of an engine.

Some prior art aircraft engine mounting apparatuses have fail-safety mechanisms, but such mechanisms may be unduly stressed in the event of a failure in normal load-bearing paths and/or such mechanisms may be insufficient to address the type(s) of failure that may occur within the mounting apparatus.

SUMMARY OF THE INVENTION

The present invention solves the above-described problems and provides a distinct advance in the art of engine mounts. More particularly, the present invention provides an aircraft engine support mount that is fail-safe, reduces stresses associated with fail-safe engagement along at least one axis, and more generally provides for improved coverage of failure(s) that may occur requiring reactive fail-safe load bearing across multiple axes.

An engine support mount for supporting an engine having a casing constructed in accordance with an embodiment of the invention includes an airframe structure having a length that extends along an x-axis, with a second axis being defined perpendicularly to the x-axis. The airframe structure includes a first anchor surface. A support member is fixed to the airframe structure and includes a first lug spaced from the first anchor surface along the second axis. The engine support mount further includes a mounting assembly having an elongated arm and a primary attachment assembly attaching the arm to the first lug. The elongated arm includes a second anchor surface spaced from the primary attachment assembly along the second axis. The engine support mount still further includes a moment arm reduction feature having a second lug and a corresponding fastener. The second lug is fixed to one of the anchor surfaces and the fastener is fixed to the other of the anchor surfaces. The fastener has a diameter, and the second lug defines an aperture having a diameter. The fastener extends through the aperture, with the diameter of the aperture being over-sized so that a load-bearing path is not established between the fastener and the second lug during normal operation.

Another embodiment of an engine support mount for supporting an engine having a casing includes an airframe structure including a first anchor surface and having a length that extends along an x-axis, with a second axis being defined perpendicularly to the x-axis. A support member fixed to the airframe structure defines a first aperture and a second aperture spaced from the first aperture along the second axis. The engine support mount further includes a mounting assembly having: (A) an elongated arm including a second anchor surface, and (B) first and second primary attachment assemblies respectively attaching the arm to the support member at the first and second apertures. The engine support mount still further includes a moment arm reduction feature having a lug and a corresponding fastener. The lug is fixed to one of the anchor surfaces and the fastener is fixed to the other of the anchor surfaces. The first anchor surface is positioned on the airframe structure outside of the first and second apertures along the second axis. The second anchor surface is positioned on the arm outside of the first and second attachment assemblies along the second axis.

Yet another embodiment of an engine support mount for supporting an engine having a casing includes an airframe structure having a first anchor surface and a length that extends along an x-axis, with a second axis being defined perpendicularly to the x-axis. A support member is fixed to the airframe structure and defines an aperture. The engine support mount further includes a mounting assembly having: (A) an elongated arm including a second anchor surface, and (B) a primary attachment assembly attaching the arm to the support member at the aperture. The engine support mount still further includes an engine link assembly having a link comprising a first portion and a second portion. The first portion is attached to the arm and the second portion is attached to the engine casing. The engine support mount yet still further includes a moment arm reduction feature having a lug and a corresponding fastener. The lug is fixed to one of the anchor surfaces and the fastener is fixed to the other of the anchor surfaces. At least a portion of each of the anchor surfaces is positioned closer to the link than to the primary attachment assembly along the second axis.

This summary is provided to introduce a selection of concepts in a simplified form that are further described below in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 9 is a partial exploded isometric view of the forward installation of FIG. 3, depicting additional detail of a thrust assembly and moment arm reduction feature;

FIG. 10 is a partial exploded isometric view of the forward installation of FIG. 9, depicting additional detail of a pin and fitting assembly;

FIG. 11 is a cross-sectional view taken along line 11-11 detailing the assembled pin and fitting assembly of FIG. 9;

FIG. 15 is a cross-sectional view taken along line 15-15 (see FIG. 3) detailing a fastener and lug of the moment arm reduction feature of FIG. 9;

FIG. 15A is a cross-sectional view taken along line 15-15 detailing translation of the fastener within the lug of the moment arm reduction feature of FIG. 15;

Figure 1:
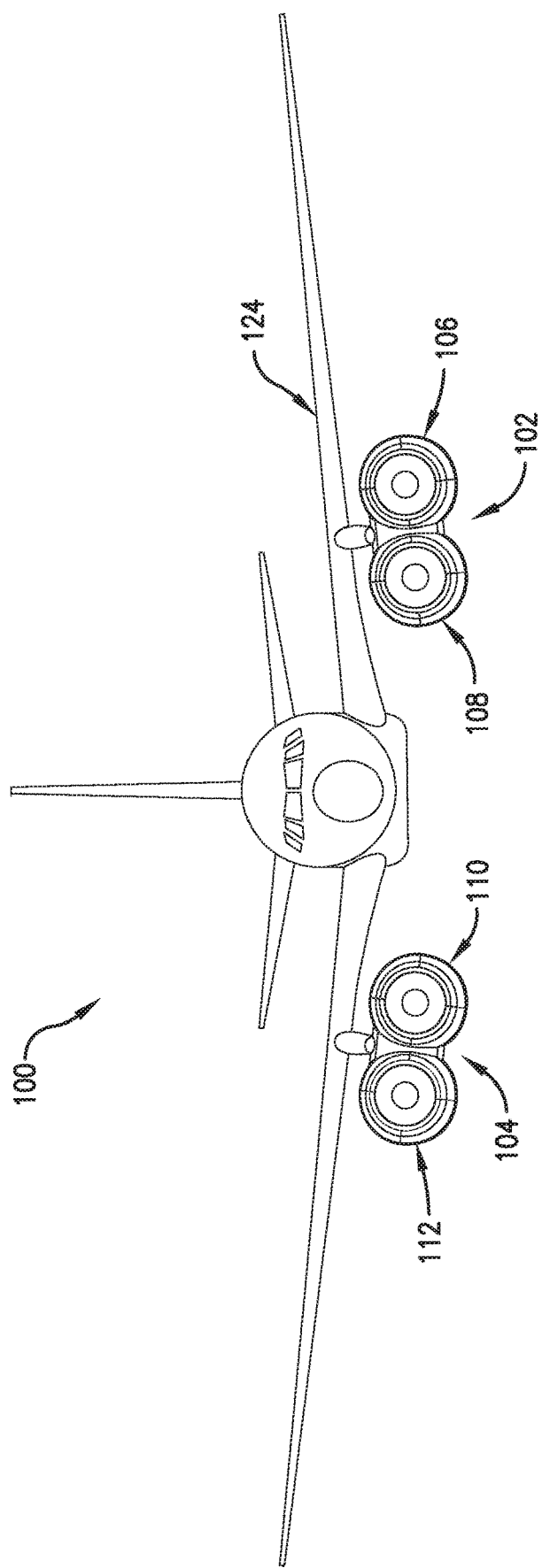
FIG. 1 is an elevation view of twin-engine support mounts installed on left and right wings of an aircraft in accordance with one embodiment of the present invention.

The drawing figures do not limit the present invention to the specific embodiments disclosed and described herein. While the drawings do not necessarily provide exact dimensions or tolerances for the illustrated components or structures, the drawings are to scale with respect to the relationships between the components of the structures illustrated in the drawings.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

Turning now to the drawing figures, and initially FIGS. 1-4, an aircraft 100 constructed in accordance with an embodiment of the invention is illustrated. The aircraft 100 includes a fuselage 101, a left twin-engine mount 102, and a right twin-engine mount 104. The left twin-engine mount 102 includes left and right engines 106, 108 installed abreast of one another, and the right twin-engine mount 104 includes left and right engines 110, 112 installed abreast of one another. The pairs of engines 106, 108 and 110, 112 are respectively installed around airframe structure under left and right wings of the aircraft 100 (discussed in more detail below). One of ordinary skill will appreciate, however, that embodiments of engine support mounts may be utilized along a fuselage (e.g., proximate or along an empennage structure) or other airframe structure, in locations atop wings, with engines mounted other than in pairs (e.g., singly), and/or in other installation configurations within the scope of the present invention.

Figure 2:
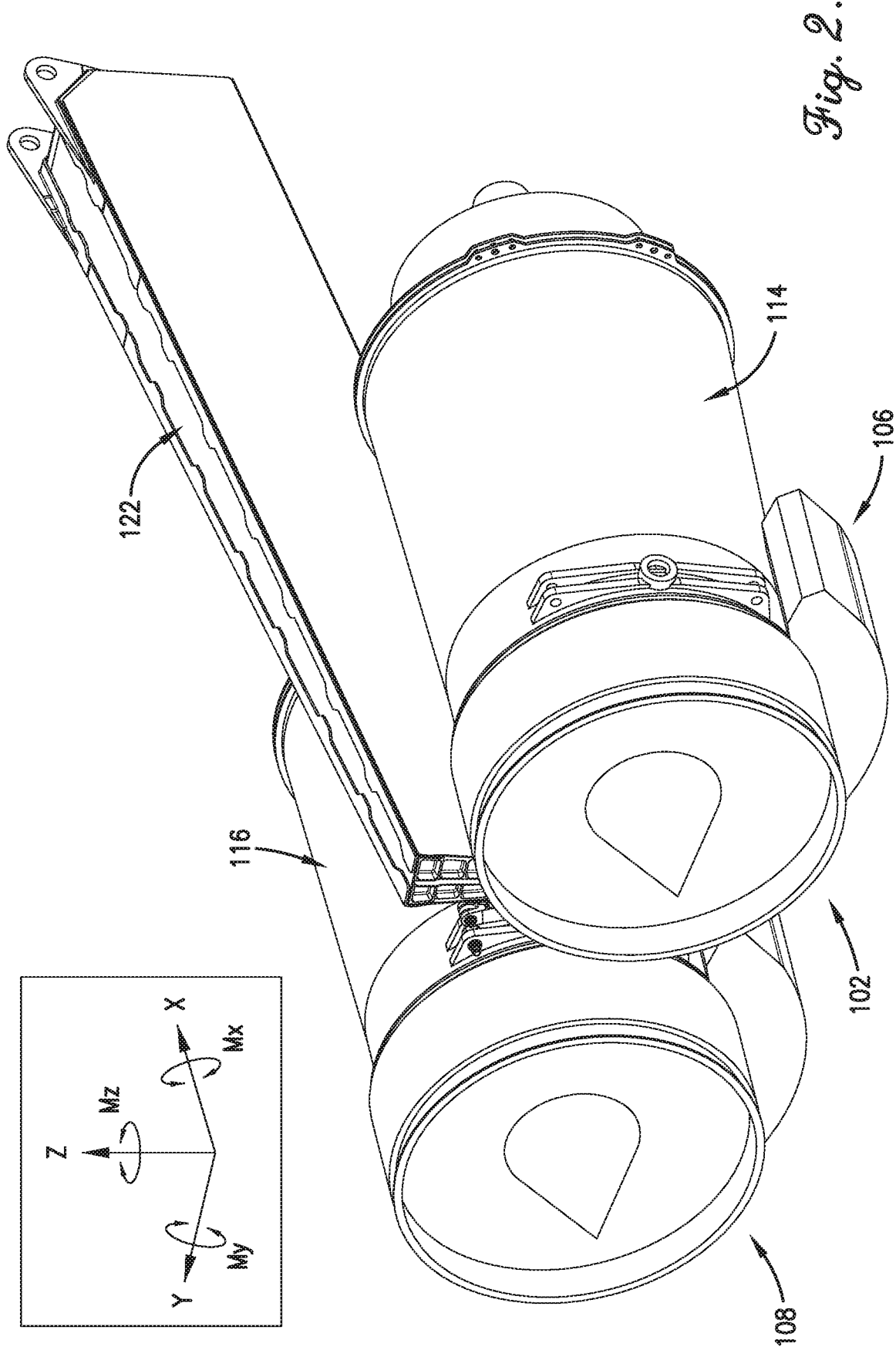
FIG. 2 is an isometric view of the twin-engine support mount and corresponding aircraft engines of the left wing of the aircraft of FIG. 1.
Figure 3:
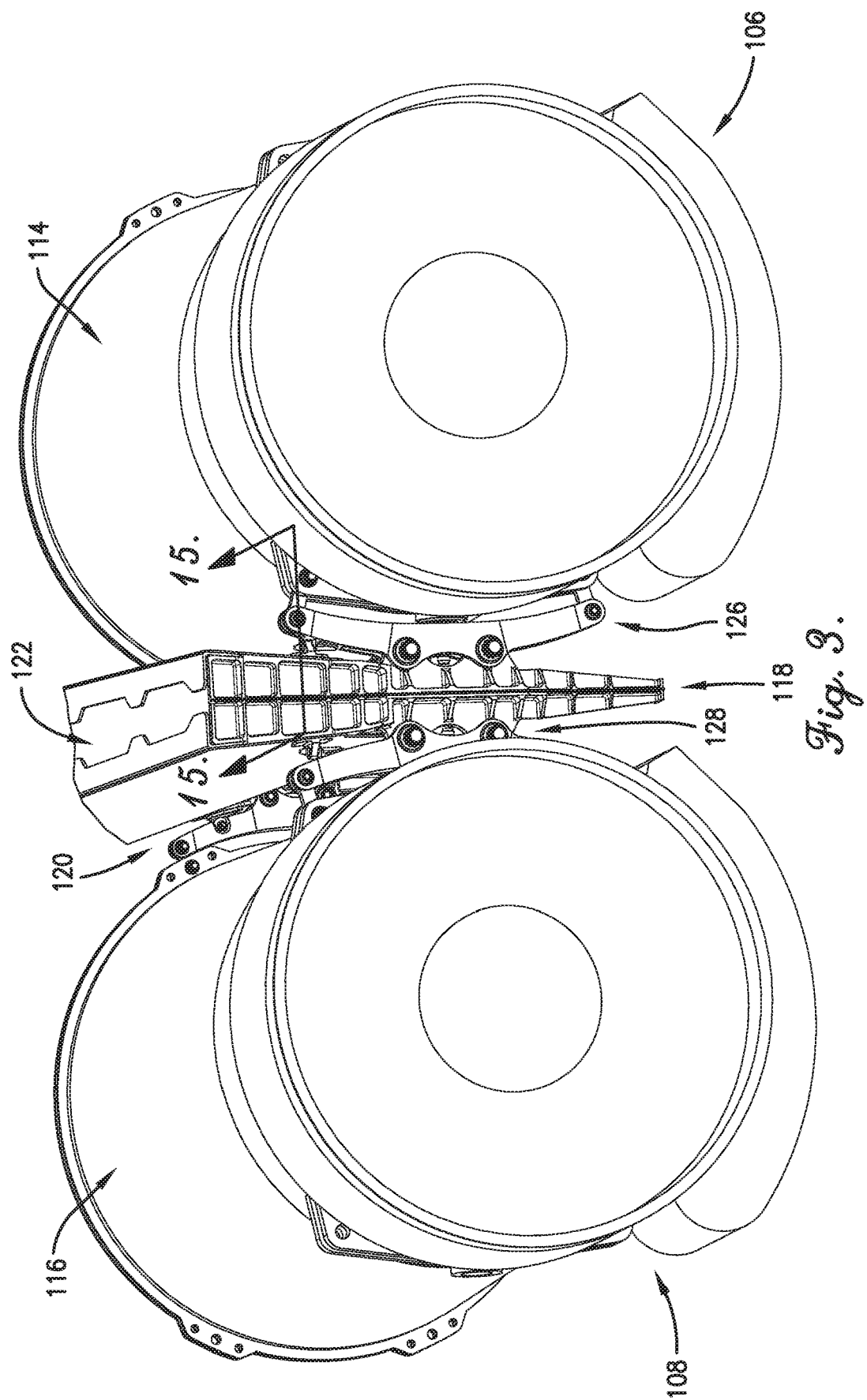
FIG. 3 is a partial isometric front view of the twin-engine support mount and corresponding aircraft engines of FIG. 2, depicting forward and aft installations.
Figure 4:
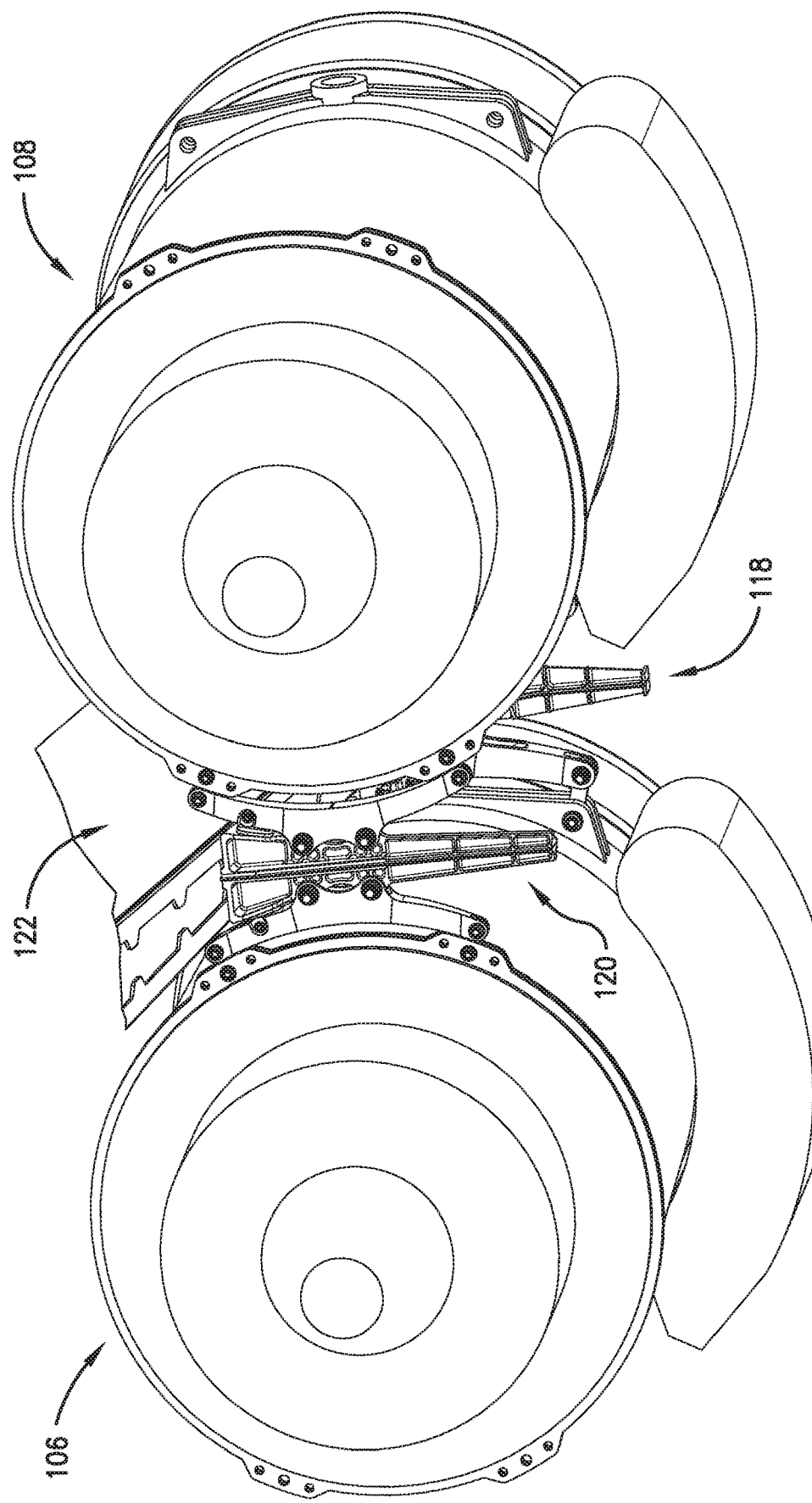
FIG. 4 is a partial isometric rear view of the twin-engine support mount and corresponding aircraft engines of FIG. 3.

As illustrated in FIG. 2, the engines 106, 108 of the left twin-engine mount 102 respectively include engine casings 114, 116. The engine casings 114, 116 are attached to forward and aft engine support installations 118, 120 (see FIG. 3). The installations 118, 120 are attached to an airframe structure including a pylon 122 attached to a left wing 124 of the aircraft 100 and having a length extending along the x-axis. The pylon 122 and engine casings 114, 116 may each comprise known airframe structure and casing materials such as aluminum, steel, titanium, carbon-fiber and/or other metals, alloys, composite materials or the like, and/or combinations of the foregoing.

It is noted that the elements of the right twin-engine mount 104 (and a corresponding pylon and wing) respectively mirror those of the left twin-engine mount 102, pylon 122 and left wing 124 described in more detail herein. Therefore, for the sake of brevity and clarity, redundant descriptions and numbering will be generally avoided here. Unless otherwise specified, the detailed descriptions of the elements presented herein with respect to the left twin-engine mount 102 and pylon 122 should therefore be understood to mirror the right twin-engine mount 104 and corresponding pylon.

Figure 5:
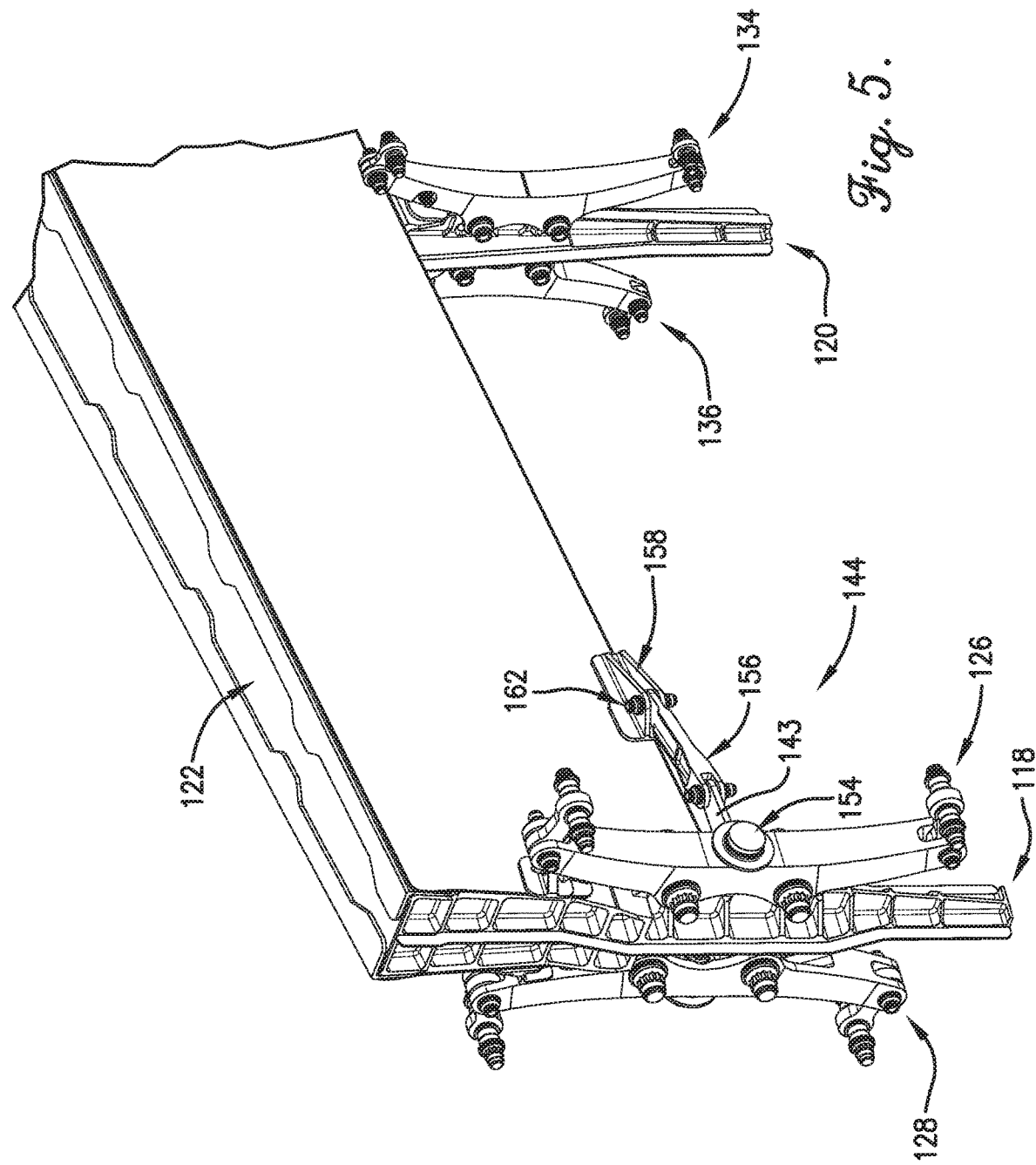
FIG. 5 is a partial isometric view of the forward and aft installations of FIG. 3.
Figure 6:
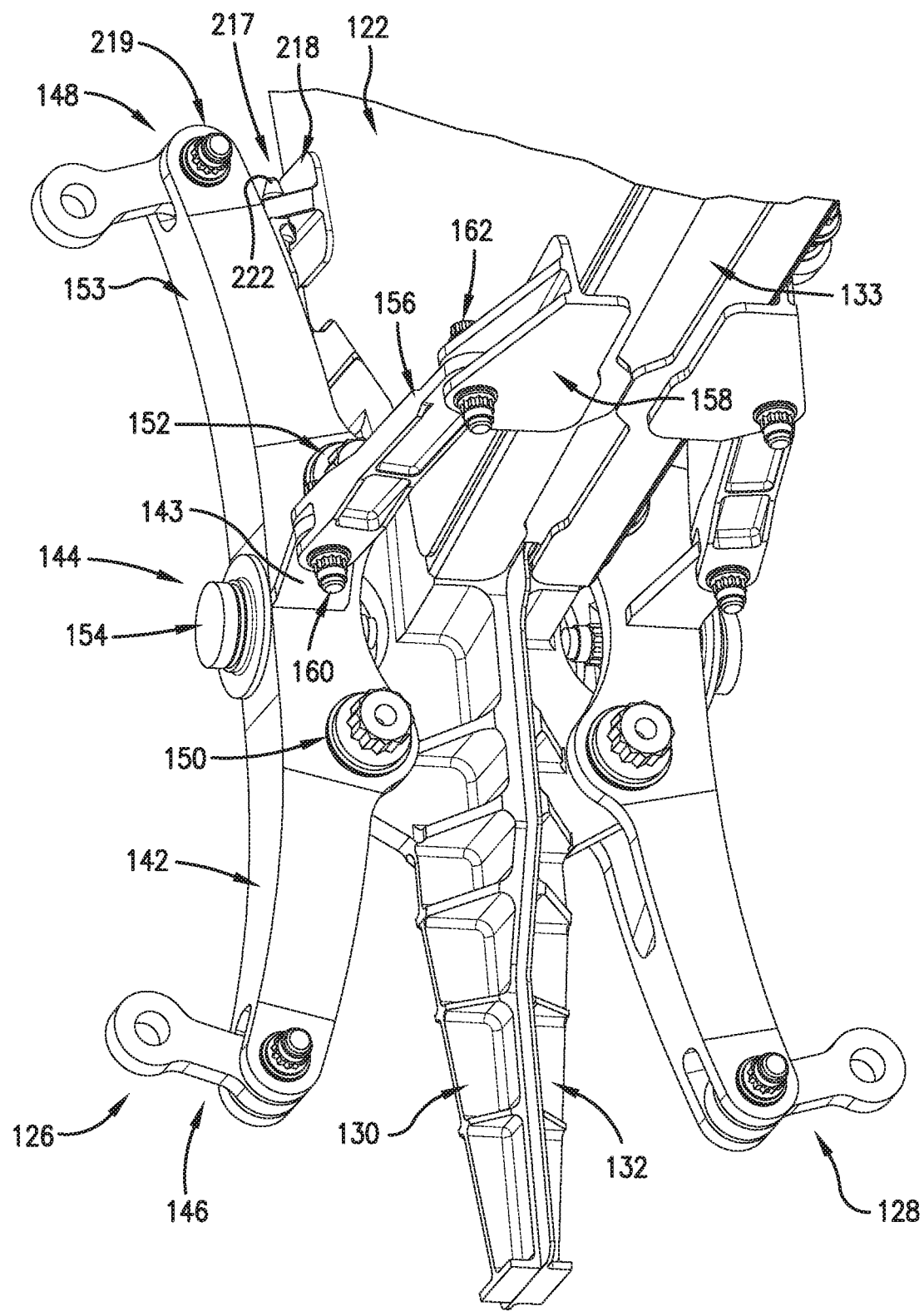
FIG. 6 is a partial isometric rear view of the forward installation of FIG. 3.
Figure 7:
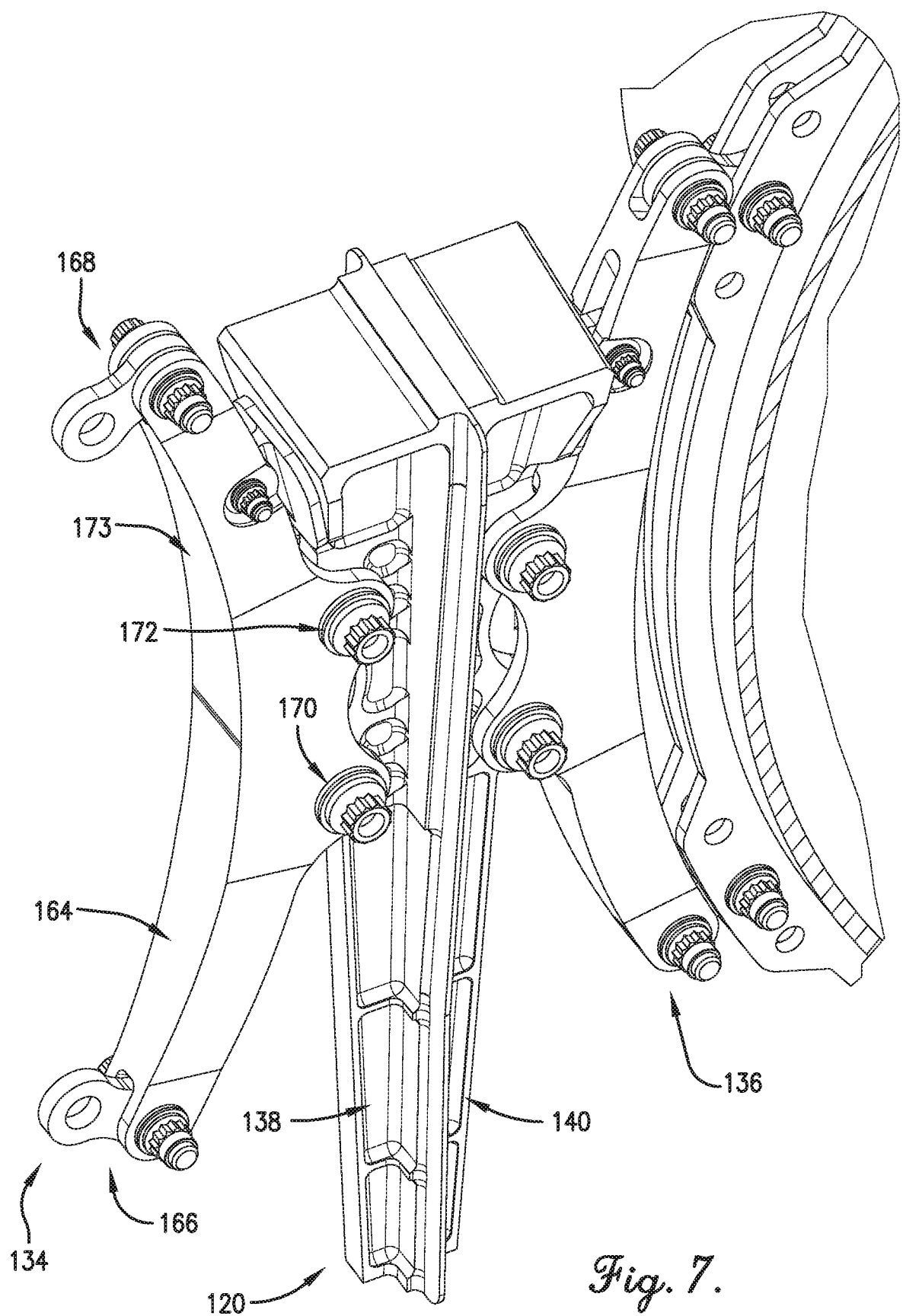
FIG. 7 is a partial isometric rear view of the aft installation of FIG. 3.
Figure 8:
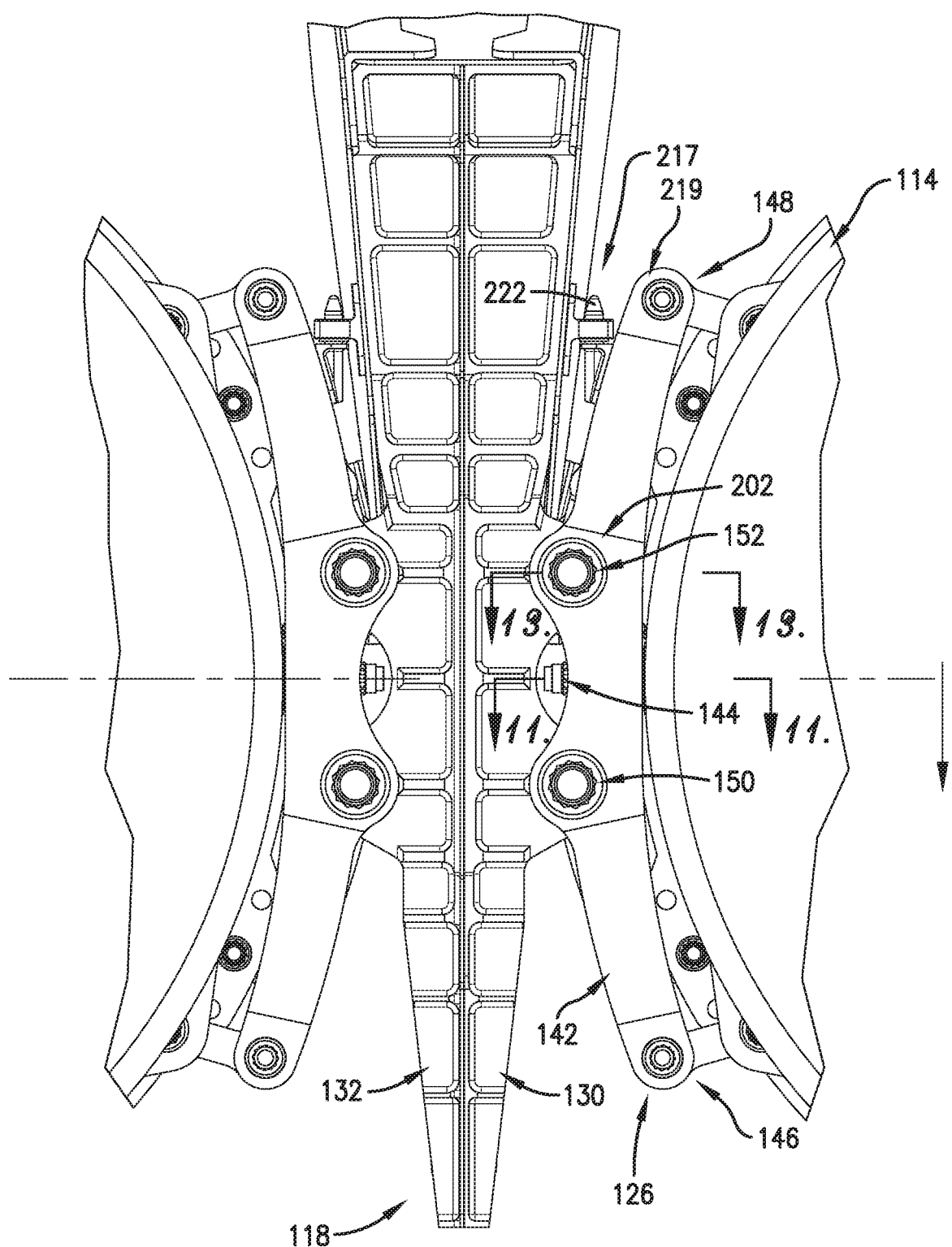
FIG. 8 is a front elevation view of the forward installation of FIG. 3.
Figure 12B:
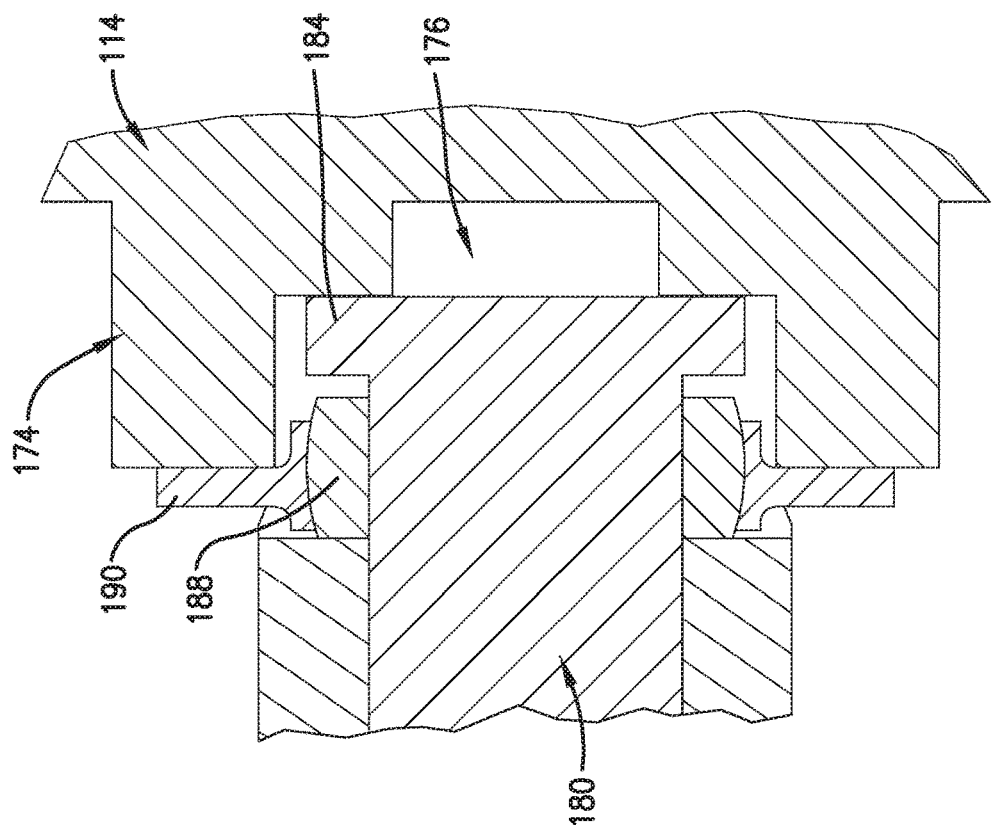
FIG. 12B is a cross-sectional view taken along line 11-11 detailing translation of the attached engine in an inboard direction with respect to the thrust pin of the pin and fitting assembly of FIG. 11.
Figure 12A:
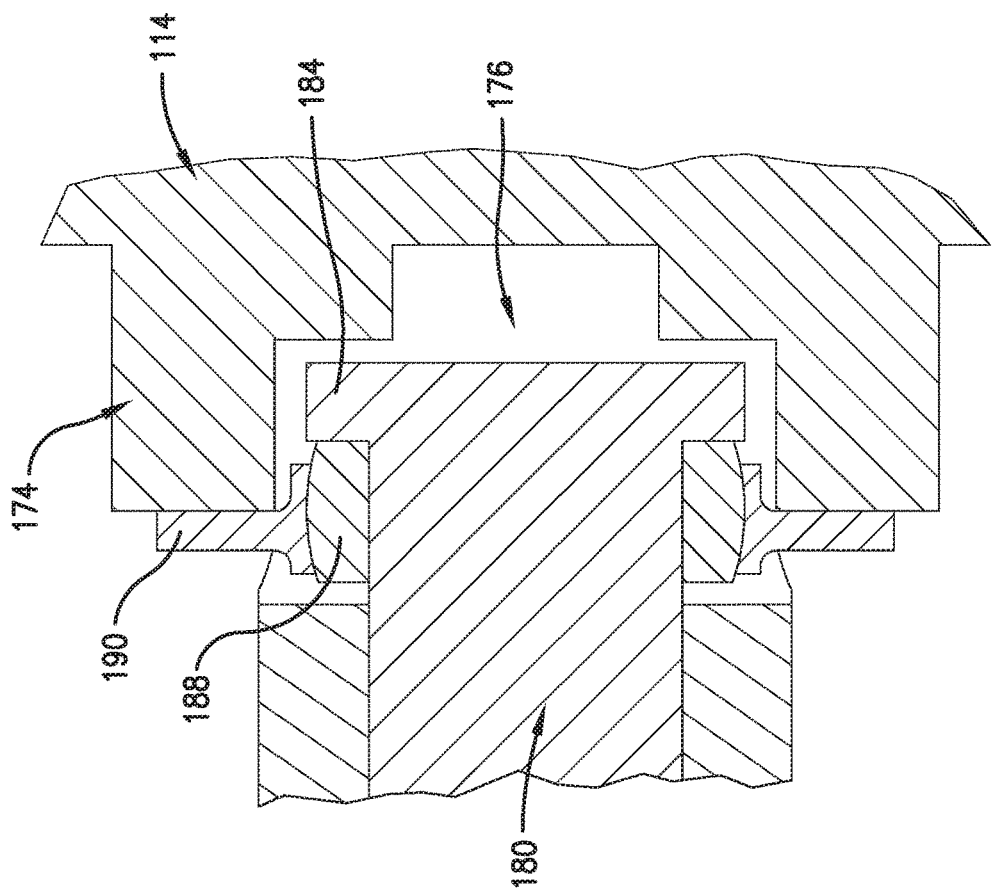
FIG. 12A is a cross-sectional view taken along line 11-11, detailing translation of an attached engine in an outboard direction with respect to a thrust pin of the pin and fitting assembly of FIG. 11.

Turning now to FIGS. 5-7, the forward engine support installation 118 includes left and right forward mount assemblies 126, 128 and corresponding left and right forward supports 130, 132. The forward mount assemblies 126, 128 and forward supports 130, 132 may each comprise carbon-fiber and/or other composite materials, but more preferably comprise aluminum, steel, titanium or the like or combinations thereof.

The forward supports 130, 132 are secured to a body 133—preferably including a lower spar—of the pylon 122. In an embodiment, the forward supports 130, 132 may comprise stainless steel or the like and may be cast and finished separately and subsequently joined using, for example, welding, adhesives, heat-treated steel bolts or other fasteners (not shown). Separate casting and finishing may mitigate the possibility of and/or risks associated with a fracture spreading from one of the forward supports 130, 132 to the other. Also or alternatively, the separate casting and finishing may provide redundant load paths in the event one of the forward supports 130, 132 fails. Following separate casting and finishing, the forward supports 130, 132 may be joined and then fixed to the body 133 of the pylon 122 or other aircraft structure using, for example, fasteners such as screws, bolts, pins or the like (not shown). The left and right forward mount assemblies 126, 128 may be respectively attached to the left and right forward supports 130, 132, as described in more detail below.

Further, the aft engine support installation 120 includes left and right aft mount assemblies 134, 136 and corresponding left and right aft supports 138, 140. The aft mount assemblies 134, 136 and aft supports 138, 140 may each comprise carbon-fiber and/or other composite materials, but more preferably comprise aluminum, steel, titanium or the like or combinations thereof. Aft supports 138, 140 are secured to the body 133 of the pylon 122 rearward of the forward supports 130, 132. Also like the forward supports 130, 132, the aft supports 138, 140 may comprise stainless steel or the like and be cast and finished separately and subsequently joined—preferably with the resulting benefits outlined above—and may then be fixed to the body 133 of the pylon 122. The left and right aft mount assemblies 134, 136 may be respectively attached to the left and right aft supports 138, 140, as described in more detail below.

One of ordinary skill will appreciate that embodiments of an engine support mount for a single engine, as compared with the twin-engine mounts of embodiments described herein, may only include a single contiguous forward support and a single contiguous aft support, single corresponding mount assemblies (forward and aft), and a corresponding engine, without departing from the spirit of the present invention. Moreover, it should be reiterated that elements of the right supports and mount assemblies 128, 132, 136, 140 respectively mirror those of the left supports and mount assemblies 126, 130, 134, 138 which are described in more detail herein. Therefore, for the sake of brevity and clarity, redundant descriptions and numbering will be generally avoided here. Unless otherwise specified, the detailed descriptions of the elements presented herein with respect to the left supports and mount assemblies 126, 130, 134, 138 should therefore be understood to mirror the right supports and mount assemblies 128, 132, 136, 140.

The exemplary left forward mount assembly 126 illustrated in FIG. 6 includes: an arcuate arm 142 having a tongue 143 extending rearward from a central location along the length of the arm 142; a thrust assembly 144 generally centered on the tongue 143; engine link assemblies 146, 148 positioned respectively at opposite ends along the length of the arm 142; and primary attachment assemblies 150, 152 positioned on the arm 142 between the engine link assemblies 146, 148. The arm 142 has a margin 153 corresponding generally to an arcuate surface opposite the primary attachment assemblies 150, 152, the margin 153 being spaced from, but having a shape that is roughly complementary to, adjacent portions of the engine casing 114.

The thrust assembly 144 includes a pin and fitting assembly 154, a thrust load link 156, a thrust lug 158 fixed to the pylon 122 (preferably, to the body 133), and fastener assemblies 160, 162. The fastener assemblies 160, 162 may each include bolts and/or pins or the like that secure components of the thrust load link 156 to, respectively, the tongue 143 and the thrust lug 158. One of ordinary skill will appreciate that a fastener assembly may include a nut, gasket, fitting, washer, sleeve, bushing, resilient interface, clevis, lug, ball joint, rod end, and/or the like, or any other fastener or combination of fasteners, and may optionally permit rotation thereabout by joined members, within the scope of the present invention.

Turning now to FIG. 7, the exemplary left aft mount assembly 134 includes: an arcuate arm 164; engine link assemblies 166, 168 positioned respectively at opposite ends of the length of the arm 164; and primary attachment assemblies 170, 172 positioned on the arm 164 between the engine link assemblies 166, 168. The arm 142 has a margin 173 corresponding generally to an arcuate surface opposite the primary attachment assemblies 170, 172, the margin 173 being spaced from, but having a shape that is roughly complementary to, adjacent portions of the engine casing 114.

One of ordinary skill will appreciate that the relative locations and configurations of components of forward and/or aft mount assemblies may vary without departing from the scope of the present invention.

Turning now to FIGS. 8, 9, 10, 11, 12A and 12B, the thrust assembly 144 is illustrated in additional detail. The engine casing 114 includes a boss 174 defining a cylindrical cavity 176 therein. A corresponding central portion along the length of the arm 142 likewise defines a cylindrical cavity 178 terminating in a relatively narrow aperture 179. Portions of the pin and fitting assembly 154 extend through the cavities 176, 178 and secure the casing 114 against the arm 142 along at least one axis during operation, thereby transferring thrust load produced by operation of the engine 106 from the casing 114 to the arm 142, from the arm 142 to the thrust load link and lug 156, 158, and ultimately to the pylon 122 (referred to herein as the "primary thrust load path").

More particularly, the thrust pin and fitting assembly 154 includes a thrust pin 180 having a cylindrical main shaft 182, a circular flange head 184 and a narrowed cylindrical tip 186 opposite the head 184. The thrust pin 180 may comprise stainless steel, aluminum or another known fastener material. The narrowed tip 186 may include external threading (not shown) or similar ridge-like features for securing the thrust pin 180 to the mount arm 142, as described in more detail below.

The thrust pin and fitting assembly 154 also includes a resilient interface 188 defining an aperture 189 and sized for receipt within a thrust fitting 190. The aperture 189 may be of equivalent diameter to, or slightly larger diameter than, the diameter of the main shaft 182. Either or both of the resilient interface 188 and thrust fitting 190 may comprise elastomeric materials, metals, metal alloys and/or other materials. One of ordinary skill will appreciate that such a fitting assembly may also or alternatively comprise any of nuts, gaskets, fittings, washers, sleeves, bushings and/or the like within the scope of the present invention. It foreseen that a boss may additionally or alternatively define a conical or similar cavity tapering inwardly toward a thrust pin, and/or that a thrust pin cylindrical main shaft may taper as it extends away from a circular flange head, without departing from the spirit of the present invention.

As particularly detailed in FIG. 11, in connection with assemblage of the engine casing 114 to the left forward mount assembly 142, the resilient interface 188 is secured within an aperture 191 of the thrust fitting 190. The thrust pin 180 is inserted into the aperture 189 of the resilient interface 188 until the head 184 is separated from the resilient interface 188 by a minimum first distance or gap 192, which is preferably of a pre-determined size. Further, the assembled thrust pin 180, resilient interface 188 and thrust fitting 190 are secured to the boss 174 (e.g., using adhesives, welding, fasteners or the like) along the thrust fitting 190. Still further, the aperture 179 defined by the arm 142 may be centered on the narrowed tip 186 of the thrust pin 180, and the narrowed tip 186 may be inserted through the aperture 179 and secured against the arm 142 using a thrust pin retention nut 198 so that a surface 194 of the resilient interface 188 is separated from a nearest adjacent surface 195 of the arm 142 by a minimum second distance or gap 196. The second distance or gap 196 is also preferably of a pre-determined size. One of ordinary skill will appreciate that a variety of fasteners and engaging structures, adhesives, welding or other means may be utilized to secure the thrust pin 180 to the arm 142 without departing from the spirit of the present invention. One of ordinary skill will also appreciate that the order of assembly outlined above is merely exemplary, and may vary without departing from the spirit of the present invention.

Returning briefly to the axes illustrated in FIG. 2, it should be noted that the load transferred along the primary thrust load path is, during normal operation, generated by the engine 106 (for example) along the x-axis. Therefore, the primary function of the thrust pin and fitting assembly 154 within the boss 174 illustrated in FIG. 11 is to transfer said load away from the engine casing 114 toward the pylon 122 during normal operation. However, as outlined above, the preferred thrust pin 180 and fitting assembly 154 also incorporates gaps 192, 196. This preferred configuration of the thrust pin and fitting assembly 154 may enable it to contribute to a fail-safe "in waiting" feature for failures of the forward and/or aft engine support installation(s) 118, 120 that result in undesired movement along the y-axis of the engine 106 with respect to the pylon 122. More particularly, a preferred configuration of thrust pin and fitting assembly may contribute in the event of failure of an engine link assembly, mount arm or the like.

The sizes of the gaps 192, 196 are preferably pre-determined so as to allow a range of movement along the y-axis of the thrust pin 180 within the boss 174 that would be expected to occur during normal operation. The pre-determined sizes of the gaps 192, 196 may accommodate such an expected range of movement along the y-axis, and may even accommodate a wider range of movement to account for extraordinary scenarios or edge cases that nonetheless would not necessarily result from a failure in the forward and/or aft engine support installation(s) 118, 120.

More particularly, designers may model normal operational stresses and forces on the forward and aft engine support installations 118, 120 and project resulting movement along the y-axis of the thrust pin 180 within the boss 174, and/or perform corresponding physical tests. Designers may further calculate a degree of translation of the thrust pin 180 within the boss 174 along the y-axis that has a threshold likelihood of being associated with a fracture or other failure in the forward and/or aft engine support installation 118, 120, rather than being associated with normal flexure, elongation and other resilient deformation of components of those installations 118, 120. In an embodiment, designers may identify one or more weak component(s) of the installations 118, 120, and may determine the degree of translation likely to be associated with a fracture or other failure by focusing on those weak component(s). It should also be noted that "normal operation" as used herein generally refers to operation in the absence of fracture, breakage, inelastic deformation and/or the like within an engine support installation.

In an embodiment, the threshold likelihood may be anywhere between thirty and seventy percent (30-70%). The size of gap 192 may thus be determined from the degree of translation of the thrust pin 180 away from the engine casing 114 (i.e., movement of the engine 106 in the "outboard" direction) that meets the threshold likelihood outlined above. Likewise, the size of gap 196 may be determined from the degree of translation of the thrust pin 180 toward the engine casing 114 (i.e., movement of the engine 106 in the "inboard" direction) that meets the threshold likelihood outlined above. It should be noted that any actual gap sizes set out herein refer to relative component positions from the perspective of a fully assembled aircraft at rest.

The sizes of the gap 192, 196 may also be adjusted by a clearance factor that increases the sizes beyond the aforementioned respective degrees of translation by a given percentage, as discussed in more detail below. This may further protect such a fail-safe "in waiting" feature from unintended engagement during normal operation that might reduce longevity. In an embodiment, the "threshold likelihood" outlined above may be omitted from design efforts, e.g., by simply setting a degree of translation of a given component above which it is assumed to have resulted from a failure and below which it is assumed to have resulted from normal flexure, elongation or other resilient deformation.

Exemplary gaps 192, 196 may respectively measure—on a grounded aircraft with systems powered down in an ambient environment at seventy-five degrees Fahrenheit (75° F.) and one atmosphere (atm) (a "Resting State")—at least fifteen hundredths of an inch (0.15"), inclusive. A clearance factor of between sixty-seven percent (67%) and one hundred and thirty-three percent (133%) may add between one-tenth and two-tenths of an inch (0.1-0.2") to one or both of the gaps 192, 196, increasing size to between twenty-five and thirty-five hundredths of an inch (0.25-0.35") without departing from the spirit of the present invention.

Whenever translation of the thrust pin 180 along the y-axis within the boss 174 causes the head 184 to completely traverse one of the gaps 192, 196, an "outboard" or "inboard" fail-safe load path may be established. If the gap 192 is closed by movement of the pin 180 along the y-axis (see FIG. 12A), the "outboard" fail-safe load path may be established between the resilient interface 188 and the thrust pin 180, preventing or reducing further movement of the engine 106 away from the pylon 122. Conversely, if the gap 196 is closed by movement of the pin 180 along the y-axis (see FIG. 12B), the "inboard" fail-safe load path may be established between the resilient interface 188 and the surface 195 of the mount arm 142, preventing or reducing further movement of the engine toward the pylon 122.

One of ordinary skill will appreciate that various modeling programs, test procedures and design philosophies may be utilized to determine the size of fail-safe "in waiting" load path gaps outlined herein within the scope of the present invention.

Figure 13:
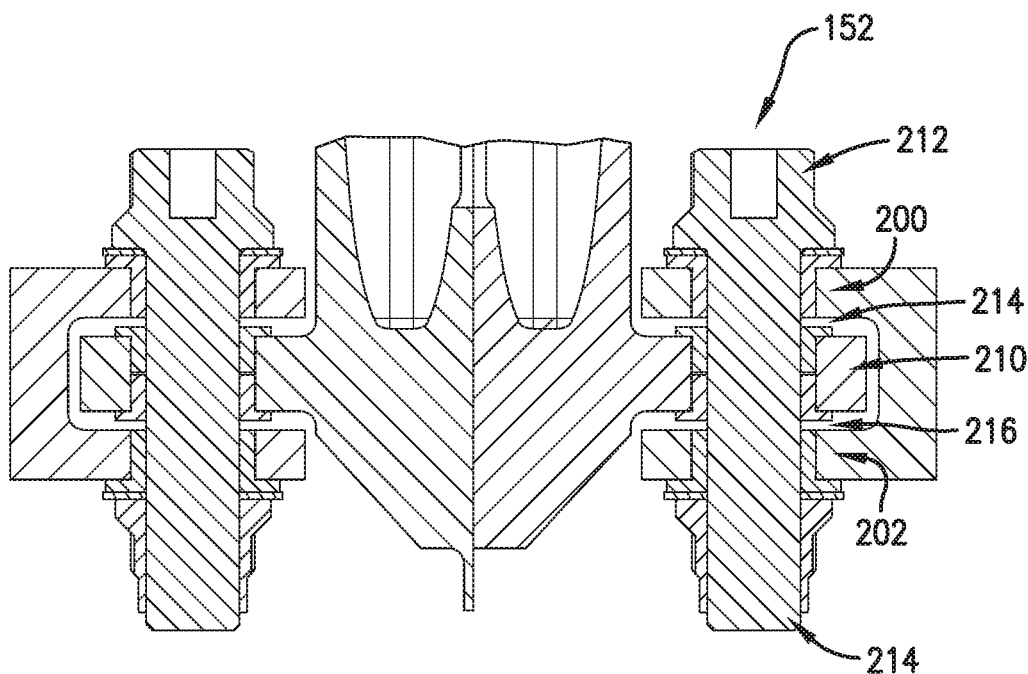
FIG. 13 is a cross-sectional view taken along line 13-13 detailing a primary attachment assembly and corresponding first, second and third lugs of the forward installation of FIG. 8.

Turning now to FIG. 13, another fail-safe "in waiting" feature of a preferred embodiment of the present invention is detailed. More particularly, during normal operation, primary attachment assemblies 150, 152 preferably act as a force couple that reacts z-axis, y-axis, and $M_x$ (i.e., torsional) applied loads. The arm 142 and primary attachment assembly 152, for example, preferably form a lug-clevis pinned joint comprising: spaced lugs 200, 202 on the arm 142 respectively defining apertures 204, 206; a corresponding aperture 208 defined in a lug 210 of the forward support 130, the lug 210 fitting between the lugs 200, 202 of the arm 142 (see FIG. 9); and a pin 212 inserted through aligned apertures 204, 206, 208. The preferred embodiments of lugs 200, 202 and 210 each also include a cylindrical sleeve (e.g., a steel sleeve or bushing) surrounding the pin 212.

Another lug-clevis pinned joint is formed by arm 142 and primary attachment assembly 150. It is noted that the elements of the lug-clevis pinned joint formed by arm 142 and primary attachment assembly 150 correspond to those of the lug-clevis pinned joint formed by arm 142 and primary attachment assembly 152 described in more detail herein. Therefore, for the sake of brevity and clarity, redundant descriptions and numbering will be generally avoided here. Unless otherwise specified, the detailed descriptions of the elements presented herein with respect to the lug-clevis pinned joint formed by arm 142 and primary attachment assembly 152 should therefore be understood to apply to the lug-clevis pinned joint formed by arm 142 and primary attachment assembly 150.

Moreover, one of ordinary skill will appreciate that a variety of joints may be utilized in place of the exemplary lug-clevis pinned joints outlined herein without departing from the scope of the present invention. For instance, such joints may include any of bolts, pins, nuts, gaskets, fittings, washers, sleeves, bushings, resilient interfaces, clevises, lugs, ball joints, rods, and/or the like, or any other fastener or combination of fasteners within the scope of the present invention. It should also be noted that primary attachment assemblies, engine link assemblies and thrust assemblies outlined herein are configured for load bearing during normal operation. Therefore, in the preferred embodiment, each such assembly includes a lug or the like defining an aperture sized to provide just enough clearance to admit the corresponding fastener therethrough (for example, where the clearance is between five and twenty-five ten-thousandths of an inch (0.0005-0.0025 inches), optionally also permitting rotation of the fastener within the aperture. Put another way, such aperture(s) are not over-sized to provide fail-safe "in waiting" gap(s). Nonetheless, one of ordinary skill will also appreciate—for example from description of the primary attachment assemblies and lugs outlined herein—that fail-safe "in waiting" gap(s) may be additionally defined along other axes within such primary attachment assemblies, engine link assemblies and/or thrust assemblies without departing from the spirit of the present invention.

As noted above, the lug-clevis pinned joints formed by arm 142 and primary attachment assemblies 150, 152 act as a force couple that reacts z-axis, y-axis, and $M_x$ applied loads during normal operation. However, the preferred embodiment of the present invention also incorporates gaps 214, 216 respectively defined along the x-axis as minimum distances between the lug 200 and a first side of the lug 210 and between the lug 202 and a second (opposite) side of the lug 210 (see FIG. 13). This preferred configuration of the lug-clevis pinned joints associated with primary attachment assemblies 150, 152 may enable the joints to contribute to a fail-safe "in waiting" feature for failures of any component(s) along the primary thrust load path that result in undesired movement of the engine 106 with respect to the pylon 122 along the x-axis. For instance, where the thrust assembly 144 fractures or otherwise fails, and the primary thrust load path is insufficient to carry the thrust load within operational parameters, the fail-safe "in waiting" feature of the lug-clevis pinned joints associated with primary attachment assemblies 150, 152 may preserve the integrity of the installation(s) 118, 120.

The sizes of the gaps 214, 216 are preferably pre-determined so as to allow a range of movement of the lug 210 between the lugs 200, 202 along the x-axis that would be expected to occur during normal operation. The sizes of the gaps 214, 216 may also accommodate a wider range of movement to account for extraordinary scenarios or edge cases unlikely to be associated with a failure, and may be adjusted for additional clearance in accordance with the discussion above relating to gaps 192, 196 (e.g., through application of such clearance factor increases in such sizes). Determination of the sizes of gaps 214, 216, may similarly be made in accordance with the principles outlined above in connection with gaps 192, 196. For the sake of brevity and clarity, redundant descriptions will be generally avoided here. Unless otherwise specified, the detailed descriptions of the methodologies for arriving at the sizes of gaps 192, 196 should therefore be understood to apply to determination of the sizes of gaps 214, 216.

Exemplary gaps 214, 216 may respectively measure—on an aircraft in a Resting State—at least five hundredths of an inch (0.05"), inclusive. A clearance factor of between one hundred percent (100%) and five hundred percent (500%) may add between five hundredths and twenty-five hundredths of an inch (0.05-0.25") to one or both of the gaps 214, 216, increasing size to between one tenth and three tenths of an inch (0.1-0.3") without departing from the spirit of the present invention.

Figure 14:
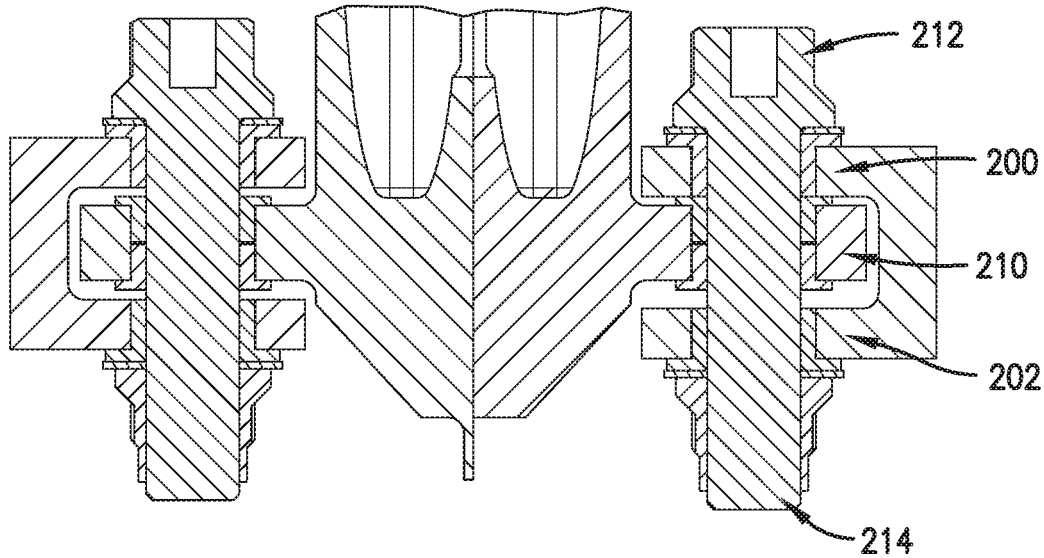
FIG. 14 is a cross-sectional view taken along line 13-13 detailing translation of the second lug within the first and third lugs of the forward installation of FIG. 8.

Whenever translation of the lug 210 along the x-axis causes the lug 210 to completely traverse one of the gaps 214, 216, a fail-safe load path may be established, preventing or reducing further movement of the engine 106 with respect to the pylon 122 in the direction in question. For instance, FIG. 14 illustrates movement of the lugs 200, 202 forward along the x-axis with respect to the lug 210, thus closing the gap 214 and establishing a fail-safe load path between the lug 210 and the lug 200 along the x-axis.

Turning now to FIGS. 9, 15 and 15A, a fail-safe "in waiting" moment arm reduction feature 217 is illustrated. More particularly, the moment arm reduction feature 217 includes a fitting comprising lug 218 fixed to the pylon 122 proximate a distal end 219 of the arm 142. The lug 218 defines an aperture 220 (see FIG. 9). The moment arm reduction feature 217 also includes a pin 222 that has a tapered end and is fixed to the distal end 219 of the arm 142. The lug 218 may include a cylindrical sleeve 224 (or bushing) surrounding the pin 222. The lug 218 is attached to the pylon 122 at an anchor surface 225.

A central purpose of the exemplary moment arm reduction feature 217 is to react applied loads along the y-axis to compensate for failure of one of the lug-clevis pinned joints formed by arm 142 and primary attachment assemblies 150, 152. The moment arm reduction feature 217 preferably thereby restrains rotation of the engine 106 about the pylon 122 that would otherwise have resulted from such a failure.

In a preferred embodiment, the moment arm reduction feature 217 advantageously does not participate in load bearing during normal operation of the aircraft 100. That is, in a preferred embodiment, during normal operation the pin 222 does not transfer load between the engine 106 and the pylon 122 along any axis. The preferred embodiment incorporates a gap 226—i.e., where a diameter, defined by either the sleeve 224 or the bare aperture 220 where the sleeve 224 is absent, is over-sized compared with a diameter of the pin 222—that prevents establishment of such a load path during normal operation, as described in more detail below. This typical disengagement from load paths along any axis may preserve the moment arm reduction feature 217 against normal wear and tear, incidental damage, or other potential sources of damage that could compromise its effective operation as a fail-safe "in waiting" when needed.

Moreover, the moment arm reduction feature 217 of a preferred embodiment is advantageously positioned outside of the lug-clevis pinned joints associated with primary attachment assemblies 150, 152. Put another way, the moment arm reduction feature 217 is preferably attached to the arm 142 at an anchor surface 227 (see FIG. 15) along the length of the arm 142 that is outside of the locations of the primary attachment assemblies 150, 152 along an axis perpendicular to the x-axis (e.g., along the z-axis). More preferably, the anchor surface 227 is located along the length of the arm 142 at a position nearer to the outermost engine link assembly 148 than to the nearest of the lug-clevis pinned joints associated with primary attachment assemblies 150, 152. The anchor surface 225 is preferably positioned along the pylon 122 in a corresponding location. That is, the anchor surface 225 is preferably spaced from the lug 202 along the pylon 122 along an axis perpendicular to the x-axis (e.g., along the z-axis) and, more preferably, is nearer a position of the outermost engine link assembly 148 along the axis than to the nearest of the lug-clevis pinned joints associated with primary attachment assemblies 150, 152.

In a scenario in which one of the lug-clevis pinned joints associated with primary attachment assemblies 150, 152 fails, an applied load would preferably be reacted along the y-axis to restrain clockwise rotation of the engine 106 about the pylon 122. Further, a distance between the engine link assembly 148 and the moment arm reduction feature 217 may be considered a lever or moment arm in the context of reacting such an applied load. In this failure scenario, locating the moment arm reduction feature 217 outside the primary attachment assemblies 150, 152 and, preferably, nearer the engine link assembly 148, may shorten the length of such a lever or moment arm as compared with, for example, a fail-safe feature located between the primary attachment assemblies 150, 152. This may, in turn, reduce the stresses introduced on the moment arm reduction feature 217 in reacting such applied loads resulting from a failure, and mitigate the risk of further failure.

The size of the gap 226 is preferably pre-determined so as to allow a range of movement of the pin 222 within the lug 218 that would be expected to occur during normal operation. The size of the gap 226 may also accommodate a wider range of movement to account for extraordinary scenarios or edge cases unlikely to be associated with a failure, and may be adjusted for additional clearance in accordance with the discussion above relating to gaps 192, 196 (e.g., through application of such clearance factor increases). Determination of the size of gap 226 may similarly be made in accordance with the principles outlined above in connection with gaps 192, 196. For the sake of brevity and clarity, redundant descriptions will be generally avoided here. Unless otherwise specified, the detailed descriptions of the methodologies for arriving at the sizes of gaps 192, 196 should therefore be understood to apply to determination of the size of gap 226. One of ordinary skill will also appreciate that the gap 226 may be of relatively consistent size around the perimeter of the pin 222 within the lug 218, or may vary dependent on varying design concerns.

An exemplary gap 226 may measure—on an aircraft in a Resting State—at least two tenths of an inch (0.2"), inclusive. A clearance factor of between fifty percent (50%) and one hundred percent (100%) may add between one tenth and two tenths of an inch (0.1-0.2") to the gap 226, increasing size to between three tenths and four tenths of an inch (0.3-0.4") without departing from the spirit of the present invention. One of ordinary skill will appreciate that the minimum gap outlined above may be present along only one side of the pin 222—and, more particularly, along an outboard side of the pin 222—within the scope of the present invention.

Whenever translation of the pin 222 along the y-axis causes the pin 222 to completely traverse the gap 226, a fail-safe load path may be established, preventing or reducing further movement of the engine 106 with respect to the pylon 122 in the direction in question. For instance, FIG. 15A illustrates movement of the pin 222 outboard along the y-axis with respect to the lug 218, thus closing the gap 226 along one side and establishing a fail-safe load path between the pin 222 and the lug 218.

Figure 16:
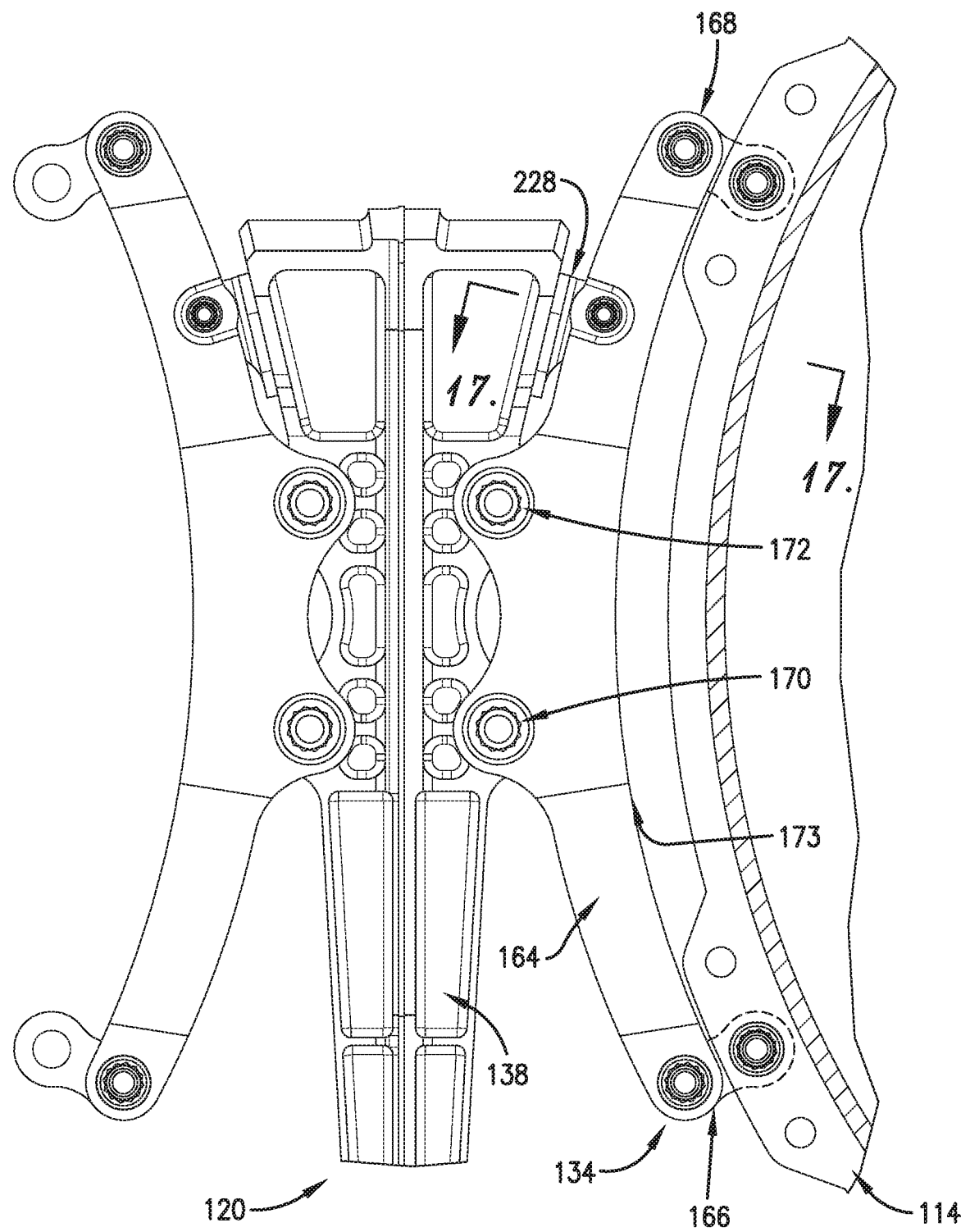
FIG. 16 is a partial front elevation view of the aft installation of FIG. 3.
Figure 17:
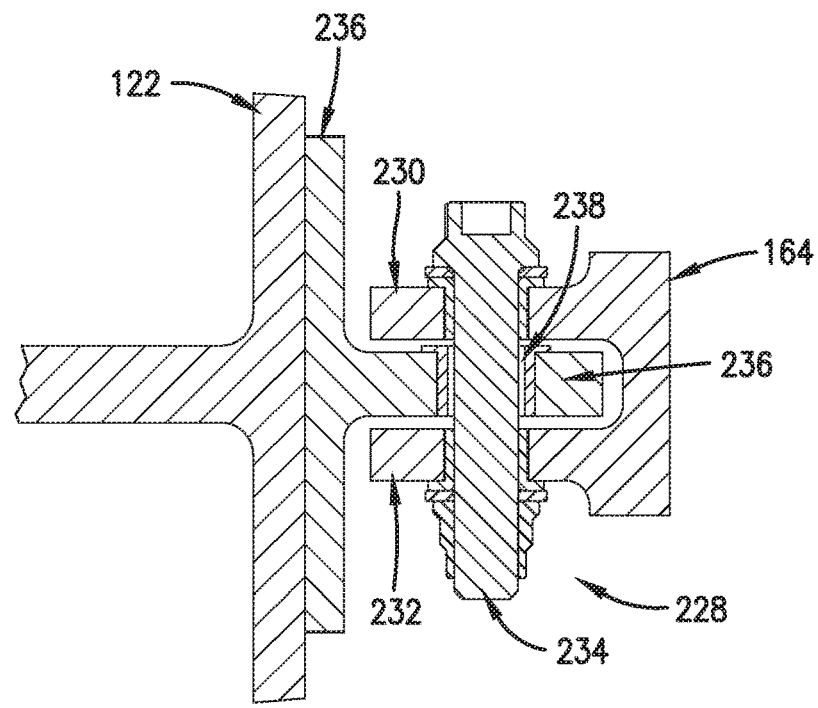
FIG. 17 is a cross-sectional view taken along line 17-17 detailing a fastener and first, second and third lugs of a second moment arm reduction feature of the aft installation of FIG. 16.

Turning now to FIGS. 16-17, a second moment arm reduction feature 228 is illustrated in connection with the aft engine support installation 120. The second moment arm reduction feature 228 preferably comprises a lug and clevis pinned joint including: spaced lugs 230, 232 on the arm 164 respectively defining apertures (not numbered) for receiving a pin 234 (see FIG. 17); and a lug 236 attached to the pylon 122 and defining a corresponding aperture (not numbered), the lug 236 fitting between the lugs 230, 232 of the arm 164 (see FIG. 17) and the pin 234 being inserted through the aligned apertures of the lugs 230, 232, 236. The preferred embodiments of lugs 230, 232, 236 each also include a cylindrical sleeve (e.g., a steel sleeve or bushing) surrounding the pin 234. The aperture defined by the lug 236 is over-sized in comparison with the pin 234, and incorporates a gap 238 for fail-safe "in waiting" load bearing.

More particularly, the second moment arm reduction feature 228 serves a similar purpose to that of the moment arm reduction feature 217. That is, to react applied loads along the y-axis to compensate for failure of one of the lug-clevis pinned joints formed by arm 164 and primary attachment assemblies 170, 172. The second moment arm reduction feature 228 preferably thereby restrains rotation of the engine 106 about the pylon 122 that would otherwise have resulted from such a failure.

One of ordinary skill will appreciate that each of moment arm reduction features 217, 228 may protect against failures in either or both of forward and aft engine installations 118, 120. Put another way, the second moment arm reduction feature 228 may react applied loads along the y-axis to compensate for the failure of one of the lug-clevis pinned joints formed by arm 142 and primary attachment assemblies 150, 152. Moreover, the moment arm reduction feature 217 may react applied loads along the y-axis to compensate for failure of one of the lug-clevis pinned joints formed by arm 164 and primary attachment assemblies 170, 172. It is also foreseen that the particular fasteners contributing to the features 217, 228 may vary across and within each of the installations 118, 120 without departing from the spirit of the present invention.

The second moment arm reduction feature 228 also preferably comprises a fail-safe "in waiting" feature that, during normal operation, does not transfer load between the engine 106 and the pylon 122, and is positioned outside of the primary attachment assemblies 170, 172, in the manner and for the reasons outlined above.

Moreover, the size of the gap 238 is preferably predetermined so as to allow a range of movement of the pin 234 within the lug 236 that would be expected to occur during normal operation. The size of the gap 238 may also accommodate a wider range of movement to account for extraordinary scenarios or edge cases unlikely to be associated with a failure, and may be adjusted for additional clearance in accordance with the discussion above relating to gaps 192, 196 (e.g., through application of such clearance factor increases). Determination of the size of gap 238 may similarly be made in accordance with the principles outlined above in connection with gaps 192, 196. For the sake of brevity and clarity, redundant descriptions will be generally avoided here. Unless otherwise specified, the detailed descriptions of the methodologies for arriving at the sizes of gaps 192, 196 should therefore be understood to apply to determination of the size of gap 238. One of ordinary skill will also appreciate that the gap 238 may be of relatively consistent size around the perimeter of the pin 234 within the lug 236, or may vary dependent on varying design concerns.

An exemplary gap 238 may measure—on an aircraft in a Resting State—at least two tenths of an inch (0.2"), inclusive. A clearance factor of between fifty percent (50%) and one hundred percent (100%) may add between one tenth and two tenths of an inch (0.1-0.2") to the gap 238, increasing size to between three tenths and four tenths of an inch (0.3-0.4") without departing from the spirit of the present invention. One of ordinary skill will appreciate that the minimum gap outlined above may be present along only one side of the pin 234—and, more particularly, along an outboard side of the pin 234—within the scope of the present invention.

Figure 17A:
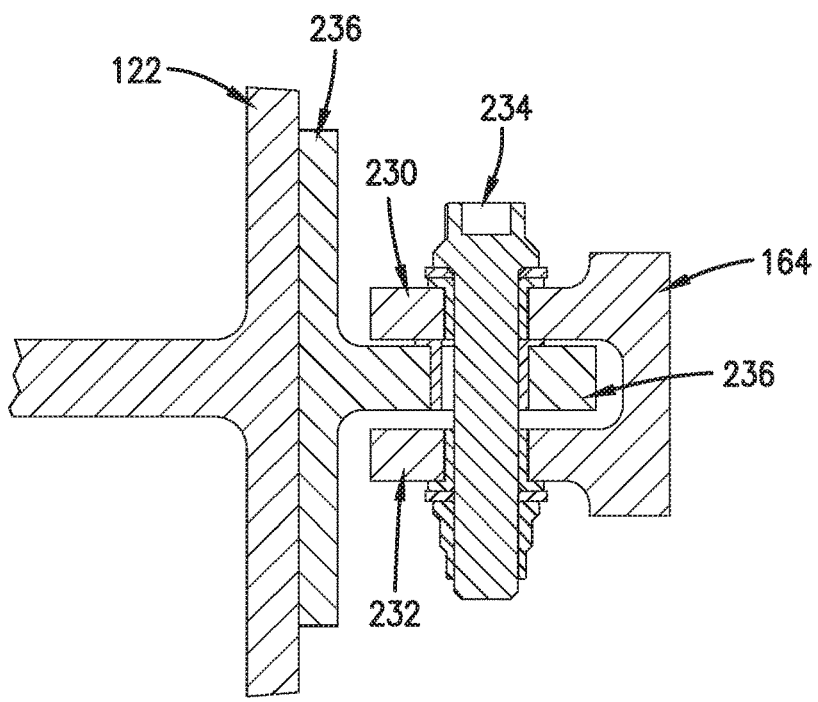
FIG. 17A is a cross-sectional view taken along line 17-17 detailing translation of the fastener within the second lug of the second moment arm reduction feature of FIG. 17.

Whenever translation of the pin 234 having a significant or primary component along the y-axis causes the pin 234 to completely traverse the gap 238, a fail-safe load path may be established, preventing or reducing further movement of the engine 106 with respect to the pylon 122 in the direction in question. For instance, FIG. 17A illustrates movement of the pin 234 outboard along the y-axis with respect to the lug 236, thus closing the gap 238 along one side and establishing a fail-safe load path between the pin 234 and the lug 236.

Figure 18:
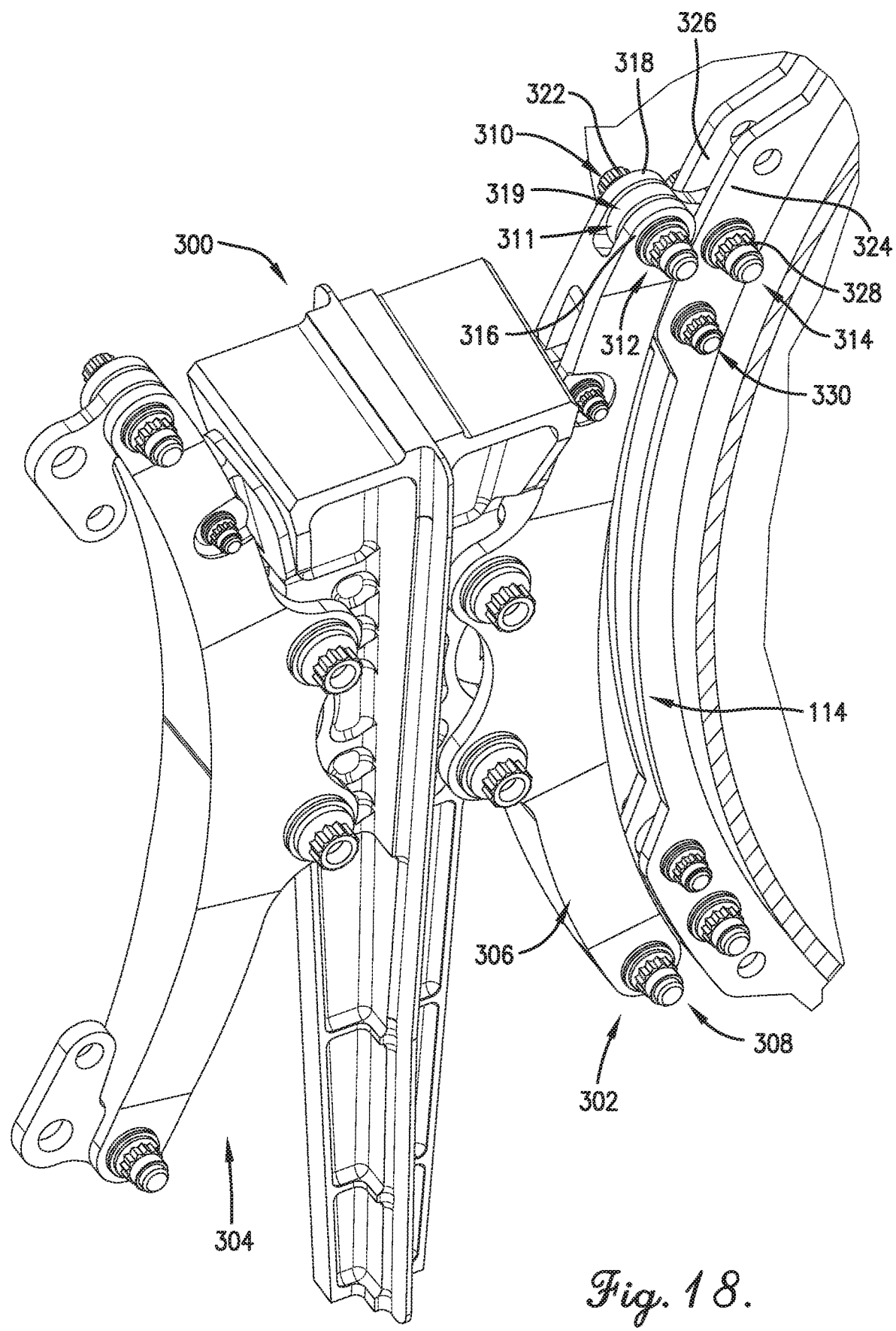
FIG. 18 is a partial isometric view of an aft installation of an engine support mount according to a second embodiment of the present invention that includes a link assembly fail-safe mechanism.
Figure 19:
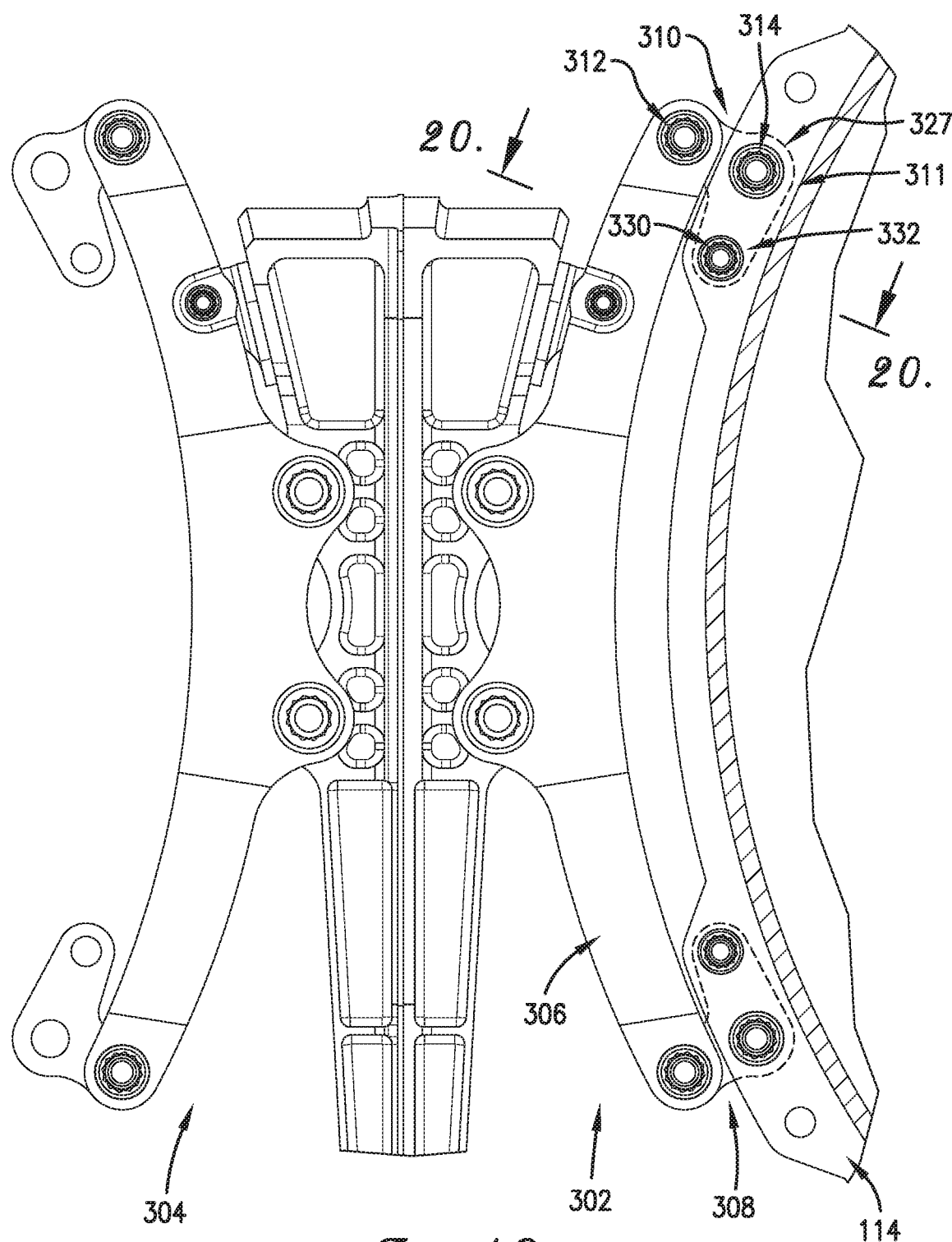
FIG. 19 is a partial front elevation view of the aft installation of FIG. 18.
Figure 20:
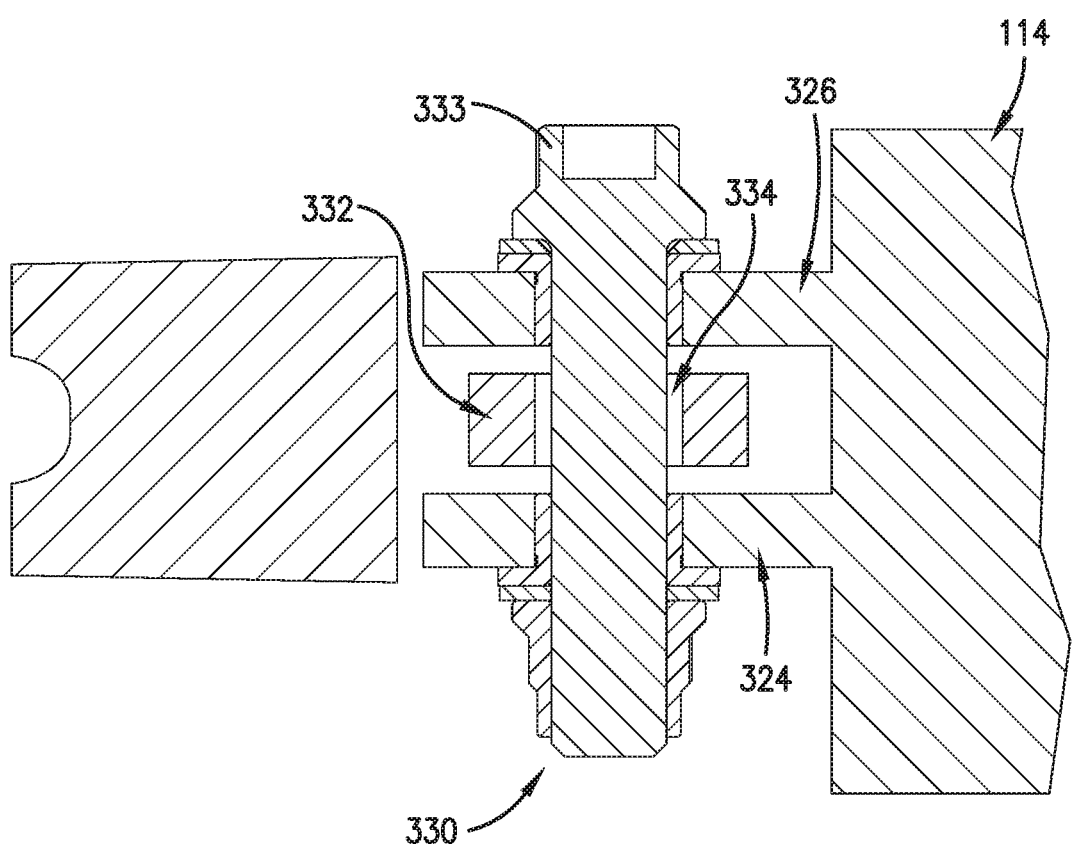
FIG. 20 is a cross-sectional view taken along line 20-20 detailing a fastener and first, second and third lugs of the link assembly fail-safe mechanism of FIG. 18.

Turning now to FIGS. 18-20, another fail-safe feature of a preferred embodiment of the present invention is detailed. The additional preferred embodiment of FIG. 18 includes an aft engine support installation 300 having left and right aft mount assemblies 302, 304. It is noted that, except as otherwise described below, the elements of the aft engine support installation 300 correspond to those of the aft engine support installation 120 described in more detail above. Therefore, for the sake of brevity and clarity, redundant descriptions and numbering will be generally avoided here. Unless otherwise specified, the detailed descriptions of the elements presented herein with respect to the aft engine support installation 120 should therefore be understood to apply to the aft engine support installation 300.

Further, the elements of the right aft mount assembly 304 mirror those of the left aft mount assembly 302 which are described in more detail herein. Therefore, for the sake of brevity and clarity, redundant descriptions and numbering will be generally avoided here. Unless otherwise specified, the detailed descriptions of the elements presented herein with respect to the left aft mount assembly 302 should therefore be understood to mirror the right aft mount assembly 304.

Still further, the fail-safe features outlined herein in connection with the aft engine support installation 300 may also be incorporated into the forward engine support installation 118 substantially in the same manner detailed in connection with the aft engine support installation 300, as shown in FIGS. 18-20 and described in the accompanying description herein.

Returning to FIGS. 18-20, the aft engine support installation 300 includes an arm 306 and engine link assemblies 308, 310 positioned respectively at opposite ends along the length of the arm 306. The elements of the engine link assembly 308 mirror those of the engine link assembly 310 which are described in more detail herein. Therefore, for the sake of brevity and clarity, redundant descriptions and numbering will be generally avoided here. Unless otherwise specified, the detailed descriptions of the elements presented herein with respect to engine link assembly 310 should therefore be understood to mirror the engine link assembly 308.

The engine link assembly 310 includes a link 311 and two primary lug-clevis pinned joints 312, 314. The link 311 may comprise any of a variety of rigid materials sufficient to bear load for supporting the engine 106, such as aluminum, steel, titanium, carbon-fiber and/or other metals, alloys or composite materials or the like, and may comprise a rod, tongue(s) and/or other elements of various form factors without departing from the spirit of the present invention.

The primary lug-clevis pinned joint 312 may include: spaced lugs 316, 318 on the arm 306 respectively defining apertures (not numbered) generally aligned along the x-axis; a corresponding aperture (not numbered) defined in a first end 319 of the link 311 adjacent the arm 306, the first end 319 of the link 311 fitting between the lugs 316, 318 of the arm 306 (see FIGS. 18, 20); and a pin 322 inserted through the aligned apertures of the lugs 316, 318 and the first end 319 of the link 311. The preferred embodiments of lugs 316, 318 and the first end 319 of the link 311 each also include a cylindrical sleeve (e.g., a steel sleeve or bushing) surrounding the pin 322.

The primary lug-clevis pinned joint 314 may include: spaced lugs 324, 326 on the engine casing 114 respectively defining a first pair of apertures (not numbered) generally aligned along the x-axis; a corresponding aperture (not numbered) defined in a middle-section 327 of the link 311 adjacent the casing 114, the middle-section 327 of the link 311 fitting between the lugs 324, 326 of the casing 114 (see FIGS. 18, 20); and a pin 328 inserted through the first aligned apertures of the lugs 324, 326 and the aperture of the middle-section 327 of the link 311. The preferred embodiments of lugs 324, 326 and the middle-section 327 of the link 311 each also include a cylindrical sleeve (e.g., a steel sleeve or bushing) surrounding the pin 328.

The engine link assembly 310 also includes a fail-safe pinned joint 330. The fail-safe pinned joint 330 may include: a second pair of apertures (not numbered) defined by the lugs 324, 326, the second pair of apertures being generally aligned along the x-axis and spaced circumferentially from the first pair of apertures defined by the lugs 324, 326; a corresponding aperture (not numbered) defined in a second end 332 of the link 311 adjacent the casing 114, the second end 332 of the link 311 fitting between the lugs 324, 326 of the casing 114 (see FIGS. 18, 20); and a pin 333 inserted through the aligned second pair of apertures of the lugs 324, 326 and the correspondingly aligned aperture of the second end 332 of the link 311. The preferred embodiments of lugs 324, 326 each also include a cylindrical sleeve (e.g., a steel sleeve or bushing) surrounding the pin 333. The aperture defined by the second end 332 of the link 311 is over-sized in comparison with the pin 333, and incorporates a gap 334 for establishment of fail-safe "in waiting" load bearing.

More particularly, the fail-safe pinned joint 330 serves to react applied loads along the y- and z-axes to compensate for failure of primary lug-clevis pinned joint 314. The fail-safe pinned joint 330 preferably thereby restrains rotation of the engine 106 about the pylon 122 that would otherwise have resulted from such a failure.

As with the other fail-safe "in waiting" features described herein, the fail-safe pinned joint 330 preferably does not, during normal operation, transfer load between the engine 106 and the pylon 122, in the manner and for the reasons outlined above.

Moreover, the size of the gap 334 is preferably predetermined so as to allow a range of movement of the pin 333 within the second end 332 of the link 311 that would be expected to occur during normal operation. The size of the gap 334 may also accommodate a wider range of movement to account for extraordinary scenarios or edge cases unlikely to be associated with a failure, and may be adjusted for additional clearance in accordance with the discussion above relating to gaps 192, 196 (e.g., through application of such clearance factor increases). Determination of the size of gap 334 may similarly be made in accordance with the principles outlined above in connection with gaps 192, 196. For the sake of brevity and clarity, redundant descriptions will be generally avoided here. Unless otherwise specified, the detailed descriptions of the methodologies for arriving at the sizes of gaps 192, 196 should therefore be understood to apply to determination of the size of gap 334. One of ordinary skill will also appreciate that the gap 334 may be of relatively consistent size around the perimeter of the pin 333 within the second end 332 of the link 311, or may vary dependent on varying design concerns.

An exemplary gap 334 may measure—on an aircraft in a Resting State—at least five hundredths of an inch (0.05"), inclusive. A clearance factor of between one hundred percent (100%) and two hundred percent (200%) may add between five hundredths and one tenth of an inch (0.05-0.1") to the gap 334, increasing size to between one tenth and fifteen hundredths of an inch (0.1-0.15") without departing from the spirit of the present invention. One of ordinary skill will appreciate that the minimum gap outlined above may be present along only one side of the pin 333—and, more particularly, along an outboard side of the pin 333—within the scope of the present invention.

Whenever translation of the pin 333 in an outboard direction causes the pin 333 to completely traverse the gap 334, a fail-safe load path may be established, preventing or reducing further movement of the engine 106 with respect to the pylon 122 in the direction in question. For instance, movement of the pin 333 outboard with respect to the link 311 may close the gap 334 and establish a fail-safe load path between the pin 333 and the link 311.

One of ordinary skill will appreciate that an analogous feature may be incorporated along an arm of an aft or forward mounting assembly to react applied loads along the y- and z-axes to compensate for failure of an arm-side primary lug-clevis pinned joint (e.g., primary lug-clevis pinned joint 312) within the scope of the present invention. It is also foreseen that various fasteners and fastening joints may comprise such a fail-safe pinned joint without departing from the spirit of the present invention. For instance, a tang of a link may be inserted into an "oversized" mortise along either of an arm and engine casing/lug(s) to provide the fail-safe "in waiting" feature.

Further, as noted above, the link assemblies 146, 148, 166, 168 (and their respective mirror assemblies along the opposite sides of installations 118, 120) may include links and primary lug-clevis pinned joints analogous or identical to those described above in connection with link assembly 310, and each may optionally also include a fail-safe pinned joint analogous or identical to fail-safe pinned joint 330. Moreover, one of ordinary skill will appreciate that various joints and fasteners may comprise and/or be incorporated into link assemblies without departing from the spirit of the present invention. For instance, such a link assembly may be a clevis, lug, ball joint, rod end, or the like, that may be secured to a flange or other attachment point of the aircraft engine with a fastener such as a pin, bolt, screw, or the like. clevis, lug, ball joint, rod end, combinations thereof, or the like.

All or some of the link assemblies may be configured to facilitate thermal expansion of the attached aircraft engine through permitting a limited range of rotation of the link about corresponding fastener(s), thereby allowing a diameter of the aircraft engine to change slightly without exerting undue force on the corresponding mount assembly or engine and/or engaging the associated fail-safe pinned joint(s).

One of ordinary skill will also appreciate that describing one component as "fixed," "attached" or "secured" to another component does not, unless expressly stated, require direct contact between the two components, it being understood that an intermediary anchoring or fastening structure or the like may be interposed between the two components to "fix" their relative movement without departing from the scope of the present invention. In an embodiment, fixing components of a moment arm reduction feature to anchor surfaces of an elongated arm and/or airframe structure may be achieved via intermediary anchoring structures and/or fasteners. For instance, in an embodiment a support member lug or the like may "fix" an anchor surface of an airframe structure to a moment arm reduction feature component without departing from the spirit of the present invention.

The above described embodiments of an aircraft engine mounting apparatus provide numerous advantages over prior aircraft engine mounting apparatus, many of which have already been described. For example, the aircraft engine mounting apparatus provides for redundancy of several portions of the apparatus. Thus, if such a portion of the aircraft engine mounting apparatus cannot provide the proper load path, either by failure or omission, embodiments of the present invention provide for continued safe operation of the aircraft engine. Moreover, particular combinations of fail-safe "in waiting" features of a preferred combination outlined herein provide for redundancies across several axes and for response to failures of various of the primary points of attachment between engines and airframe structure, therefore providing an efficient, relatively lightweight, and more holistic approach to fail-safe engine mounts.

Although the above description presents features of preferred embodiments of the present invention, other preferred embodiments may also be created in keeping with the principles of the invention. Furthermore, these other preferred embodiments may in some instances be realized through a combination of features compatible for use together despite having been presented independently in the above description.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

Furthermore, directional references (e.g., top, bottom, left, right, front, back, up, down, etc.) are used herein solely for the sake of convenience and should be understood only in relation to each other. For instance, a component might in practice be oriented such that faces referred to as "top" and "bottom" are sideways, angled, inverted, etc. relative to the chosen frame of reference.

It is also noted that, as used herein, the terms axial, axially, and variations thereof mean the defined element has at least some directional component along or parallel to the axis. These terms should not be limited to mean that the element extends only or purely along or parallel to the axis. For example, the element may be oriented at a forty-five degree (45°) angle relative to the axis but, because the element extends at least in part along the axis, it should still be considered axial. Similarly, the terms radial, radially, and variations thereof shall be interpreted to mean the element has at least some directional component in the radial direction relative to the axis.

Having thus described various embodiments of the invention, what is claimed as new and desired to be protected by Letters Patent includes the following:

1. An engine support mount for supporting an engine having a casing, the mount comprising:
   an airframe structure having a length that extends along an x-axis, with a second axis being defined perpendicularly to the x-axis, the airframe structure comprising a first anchor surface;
   a support member fixed to the airframe structure and comprising a first lug spaced from the first anchor surface along the second axis;
   a mounting assembly comprising an elongated arm and a primary attachment assembly attaching the arm to the first lug, the elongated arm comprising a second anchor surface spaced from the primary attachment assembly along the second axis; and
   a moment arm reduction feature comprising a second lug and a corresponding fastener, the second lug being fixed to one of the anchor surfaces and the fastener being fixed to the other of the anchor surfaces,
   the fastener having a diameter,
   the second lug defining an aperture having a diameter,
   the fastener extending through the aperture,
   the diameter of the aperture being over-sized so that a load-bearing path is not established between the fastener and the second lug during normal operation.

2. The engine support mount of claim 1, wherein the diameter of the aperture is over-sized to a pre-determined degree.

3. The engine support mount of claim 1, further comprising—
   a thrust assembly comprising: (A) a thrust load link fixed to the arm and to the airframe structure, (B) a thrust pin comprising a main shaft and a flange head and having a length extending perpendicularly to the x-axis, (C) a fitting fixed to the casing, and (D) a resilient interface fixed to the fitting and defining a second aperture therethrough,
   the thrust pin being fixed to the arm,
   the main shaft extending through the second aperture to restrict movement of the thrust pin relative to the casing along the x-axis,
   a first gap being defined between a first face of the flange head and an opposing surface of the casing,
   a second gap being defined between a second face of the flange head and an opposing surface of the resilient interface.

4. The engine support mount of claim 3, wherein the first gap and the second gap are of pre-determined sizes.

5. The engine support mount of claim 1, wherein—
   the first lug defines a second aperture,
   the arm comprises spaced third and fourth lugs respectively defining third and fourth apertures aligned along the x-axis with the second aperture,
   the primary attachment assembly comprises a fastener having a length extending along the x-axis and through the aligned second, third and fourth apertures to attach the arm to the first lug,
   the third lug is spaced from the first lug along the x-axis by a gap of pre-determined size so that a thrust load-bearing path is not established along the x-axis between the third lug and the first lug during normal operation.

6. The engine support mount of claim 5, wherein the gap is of pre-determined size.

7. The engine support mount of claim 1, further comprising an engine link assembly comprising a second fastener and a link comprising a first portion, a second portion and a third portion defining a second aperture, wherein—
   the first portion is attached to the arm and the second portion is attached to the engine casing,
   the engine casing defines a third aperture,
   the second fastener extends through the second aperture and the third aperture,
   the second aperture is over-sized so that a load-bearing path is not established between the second fastener, the engine casing and the third portion of the link during normal operation.

8. An engine support mount for supporting an engine having a casing, the mount comprising:
   an airframe structure having a length that extends along an x-axis, with a second axis being defined perpendicularly to the x-axis, the airframe structure comprising a first anchor surface;
   a support member fixed to the airframe structure and defining a first aperture and a second aperture spaced from the first aperture along the second axis;
   a mounting assembly comprising: (A) an elongated arm comprising a second anchor surface, and (B) first and second primary attachment assemblies respectively attaching the arm to the support member at the first and second apertures; and
   a moment arm reduction feature comprising a lug and a corresponding fastener, the lug being fixed to one of the anchor surfaces and the fastener being fixed to the other of the anchor surfaces,
   the first anchor surface being positioned on the airframe structure outside of the first and second apertures along the second axis,
   the second anchor surface being positioned on the arm outside of the first and second attachment assemblies along the second axis.

9. The engine support mount of claim 8, wherein—
   the fastener has a diameter,
   the lug defines a third aperture having a diameter,
   the fastener extends through the third aperture,
   the diameter of the third aperture is over-sized to a pre-determined degree so that a load-bearing path is not established between the fastener and the lug during normal operation.

10. The engine support mount of claim 8, further comprising— a thrust assembly comprising: (A) a thrust load link fixed to the arm and to the airframe structure, (B) a thrust pin comprising a main shaft and a flange head and having a length extending perpendicularly to the x-axis, (C) a fitting fixed to the casing, and (D) a resilient interface fixed to the fitting and defining a third aperture therethrough, the thrust pin being fixed to the arm, the main shaft extending through the third aperture to restrict movement of the thrust pin relative to the casing along the x-axis, a first gap being defined between a first face of the flange head and an opposing surface of the casing, a second gap being defined between a second face of the flange head and an opposing surface of the resilient interface.

11. The engine support mount of claim 10, wherein the first gap and the second gap are of pre-determined sizes.

12. The engine support mount of claim 8, wherein— the support member includes a second lug that defines the first aperture, the arm comprises spaced third and fourth lugs respectively defining third and fourth apertures aligned along the x-axis with the first aperture, the primary attachment assembly comprises a fastener having a length extending along the x-axis and through aligned first, third and fourth apertures to attach the arm to the second lug, the third lug is spaced from the second lug along the x-axis by a gap of pre-determined size so that a thrust load-bearing path is not established along the x-axis between the third lug and the second lug during normal operation.

13. The engine support mount of claim 12, wherein the gap is of a pre-determined size.

14. The engine support mount of claim 8, further comprising an engine link assembly comprising a second fastener and a link comprising a first portion, a second portion and a third portion defining a third aperture, wherein— the first portion is attached to the arm and the second portion is attached to the engine casing, the engine casing defines a fourth aperture, the second fastener extends through the third aperture and the fourth aperture, the third aperture is over-sized so that a load-bearing path is not established between the second fastener, the engine casing and the third portion of the link during normal operation.

15. An engine support mount for supporting an engine having a casing, the mount comprising:

an airframe structure comprising a first anchor surface and having a length that extends along an x-axis, with a second axis being defined perpendicularly to the x-axis;

a support member fixed to the airframe structure and defining an aperture;

a mounting assembly comprising: (A) an elongated arm comprising a second anchor surface, and (B) a primary attachment assembly attaching the arm to the support member at the aperture;

an engine link assembly comprising a link comprising a first portion and a second portion, the first portion being attached to the arm and the second portion being attached to the engine casing; and a moment arm reduction feature comprising a lug and a corresponding fastener, the lug being fixed to one of the anchor surfaces and the fastener being fixed to the other of the anchor surfaces, at least a portion of each of the anchor surfaces being positioned closer to the link than to the primary attachment assembly along the second axis.

16. The engine support mount of claim 15, wherein— the fastener has a diameter, the lug defines a second aperture having a diameter, the fastener extends through the second aperture, the diameter of the second aperture is over-sized to a pre-determined degree so that a load-bearing path is not established between the fastener and the lug during normal operation.

17. The engine support mount of claim 15, further comprising— a thrust assembly comprising: (A) a thrust load link fixed to the arm and to the airframe structure, (B) a thrust pin comprising a main shaft and a flange head and having a length extending perpendicularly to the x-axis, (C) a fitting fixed to the casing, and (D) a resilient interface fixed to the fitting and defining a second aperture therethrough, the thrust pin being fixed to the arm, the main shaft extending through the second aperture to restrict movement of the thrust pin relative to the casing along the x-axis, a first gap being defined between a first face of the flange head and an opposing surface of the casing, a second gap being defined between a second face of the flange head and an opposing surface of the resilient interface.

18. The engine support mount of claim 17, wherein the first gap and the second gap are of pre-determined sizes.

19. The engine support mount of claim 15, wherein— the support member includes a second lug that defines the first aperture, the arm comprises spaced third and fourth lugs respectively defining second and third apertures aligned along the x-axis with the first aperture, the primary attachment assembly comprises a fastener having a length extending along the x-axis and through aligned first, second and third apertures to attach the arm to the second lug, the third lug is spaced from the second lug along the x-axis by a gap of pre-determined size so that a thrust load-bearing path is not established along the x-axis between the third lug and the second lug during normal operation.

20. The engine support mount of claim 19, wherein the gap is of a pre-determined size.

* * * * *